US011490398B2

(12) United States Patent
Sarkis et al.

(10) Patent No.: US 11,490,398 B2
(45) Date of Patent: *Nov. 1, 2022

(54) CELL-BASED TRANSMISSION PRIORITY

(71) Applicant: QUALCOMM Incorporated, San Diego, CA (US)

(72) Inventors: Gabi Sarkis, San Diego, CA (US); Seyedkianoush Hosseini, San Diego, CA (US); Peter Gaal, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/863,901

(22) Filed: Apr. 30, 2020

(65) Prior Publication Data

US 2020/0351903 A1 Nov. 5, 2020

Related U.S. Application Data

(60) Provisional application No. 62/842,514, filed on May 2, 2019.

(51) Int. Cl.
*H04W 72/10* (2009.01)
*H04W 72/12* (2009.01)
*H04W 72/04* (2009.01)

(52) U.S. Cl.
CPC ......... *H04W 72/10* (2013.01); *H04W 72/042* (2013.01); *H04W 72/12* (2013.01)

(58) Field of Classification Search
CPC .... H04W 72/042; H04W 72/10; H04W 72/12
See application file for complete search history.

(56) References Cited

U.S. PATENT DOCUMENTS 9,438,401 B2 * 9/2016 Marinier ........... H04W 72/0413
9,520,984 B2 * 12/2016 Yang ..................... H04L 1/1854
(Continued)

FOREIGN PATENT DOCUMENTS

WO WO-2016114587 A1 * 7/2016 ........... H04L 1/1812
WO WO-2017039509 A1 * 3/2017 ........... H04L 1/1896
(Continued)

OTHER PUBLICATIONS

International Search Report and Written Opinion—PCT/US2020/031114—ISAEPO—dated Aug. 17, 2020.
(Continued)

*Primary Examiner* — Eric Nowlin
(74) *Attorney, Agent, or Firm* — Holland & Hart LLP

(57) ABSTRACT

Methods, systems, and devices for wireless communications are described. A user equipment (UE) may receive a first downlink control information (DCI) at a first time, and may receive a second DCI at a second, later time. Each DCI may contain scheduling information for scheduling a number of transmissions at the UE. A transmission associated with the first DCI on a first cell may be scheduled to start before or during a transmission associated with the second DCI on a second cell. The UE may then determine priorities associated with the first and second cells. In cases where the priority of the second cell is greater than the priority of the first cell, the UE may transmit the second scheduled transmission before it transmits the first scheduled transmission. As a result, the UE may prioritize transmitting the second scheduled transmission before the first scheduled transmission.

32 Claims, 17 Drawing Sheets

(56) References Cited

U.S. PATENT DOCUMENTS

| | | | |
|---|---|---|---|
| 9,749,963 B2* | 8/2017 | Hwang | H04W 52/288 |
| 11,139,926 B2* | 10/2021 | Aiba | H04L 1/1861 |
| 11,212,786 B2* | 12/2021 | Hosseini | H04W 72/1278 |
| 11,265,854 B2* | 3/2022 | Yang | H04L 5/0053 |
| 2015/0043433 A1* | 2/2015 | Ren | H04L 5/0055 370/329 |
| 2017/0141904 A1* | 5/2017 | Ahn | H04L 5/0055 |
| 2018/0262302 A1* | 9/2018 | Bergstrom | H04L 1/1812 |
| 2019/0296881 A1* | 9/2019 | Ang | H04W 76/15 |
| 2019/0349897 A1* | 11/2019 | Hosseini | H04L 5/0053 |
| 2019/0386804 A1* | 12/2019 | Pao | H04L 1/1887 |
| 2020/0053748 A1* | 2/2020 | Hosseini | H04L 1/1854 |
| 2020/0067678 A1* | 2/2020 | Zhou | H04L 1/1854 |
| 2020/0196247 A1* | 6/2020 | Babaei | H04W 52/365 |
| 2020/0228248 A1* | 7/2020 | Islam | H04L 5/0055 |
| 2020/0351903 A1* | 11/2020 | Sarkis | H04L 5/0064 |
| 2021/0143944 A1* | 5/2021 | Al-Imari | H04L 1/1887 |
| 2021/0243779 A1* | 8/2021 | Takeda | H04W 72/14 |
| 2021/0250134 A1* | 8/2021 | Islam | H04B 7/0456 |
| 2021/0307025 A1* | 9/2021 | Hosseini | H04W 72/0453 |
| 2021/0352704 A1* | 11/2021 | Yang | H04L 1/1854 |
| 2021/0367740 A1* | 11/2021 | Chen | H04L 5/0055 |
| 2022/0078768 A1* | 3/2022 | El Hamss | H04L 5/0055 |
| 2022/0116920 A1* | 4/2022 | Hosseini | H04W 72/048 |

FOREIGN PATENT DOCUMENTS

| | | | | |
|---|---|---|---|---|
| WO | WO-2020223671 A1 * | 11/2020 | | H04L 5/0064 |
| WO | WO-2020229879 A1 * | 11/2020 | | H04L 5/0035 |
| WO | WO-2021133974 A1 * | 7/2021 | | H04L 1/1854 |
| WO | WO-2021158086 A1 * | 8/2021 | | |

OTHER PUBLICATIONS

Mediatek Inc: "Enhancements to URLLC Scheduling/HARQ", 3GPP Draft, 3GPP TSG RAN WG1 Meeting #96b, R1-1904506 Enhancements to URLLC Scheduling/HARQ, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 3, 2019 (Apr. 3, 2019), XP051707246, 6 Pages, Retrieved from the Internet: URL: http://www.3gpp.org/ftp/tsg%5Fran/WG1%5FRL1/TSGR1%5F96b/Docs/R1%2D1904506%2Ezip, [retrieved on Apr. 3, 2019], the whole document.

* cited by examiner

CELL-BASED TRANSMISSION PRIORITY

CROSS REFERENCE

The present Application for Patent claims the benefit of U.S. Provisional Patent Application No. 62/842,514 by SARKIS et al., entitled "CELL-BASED TRANSMISSION PRIORITY," filed May 2, 2019, assigned to the assignee hereof, and expressly incorporated by reference herein.

BACKGROUND

The following relates generally to wireless communications, and more specifically to cell-based transmission priority.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may receive control information scheduling various transmissions that are sent at different times, which may be based on when the control information or a subsequent transmission is received. However, the time at which a transmission is to be sent may, in some cases, increases communications latency or may otherwise be undesirable. Therefore, techniques to better handle conflicting scheduled transmissions may be desirable.

SUMMARY

The described techniques relate to improved methods, systems, devices, and apparatuses that support cell-based transmission priority. Generally, the described techniques provide for improved methods for out-of-order transmission processes (such as out-of-order hybrid automatic repeat request (HARQ)-acknowledgment (ACK)) based on the transmission priority of a cell associated with scheduled transmissions. According to one aspect, a UE may receive a first downlink control information (DCI) at a first time, and may receive a second DCI at a second, later, time. Each DCI may include scheduling information for scheduling downlink transmissions at the UE. In one case, a downlink transmission associated with the first DCI may be scheduled on a first cell (e.g., a component carrier, a virtual cell, etc.), and may be scheduled to occur before a downlink transmission associated with the second DCI scheduled on a second cell. The UE may then determine priorities associated with the first and second cells (e.g., whether the cell is a high priority cell or a low priority cell). In cases where the priority of the second cell is greater than the priority of the first cell, the UE may transmit HARQ-ACK for the second scheduled downlink transmission before it may transmit HARQ-ACK for the first scheduled downlink transmission. In this way, the UE may prioritize transmitting HARQ-ACK feedback for the second scheduled downlink transmission, and may thus deprioritize HARQ-ACK feedback for the first scheduled downlink transmission.

According to another aspect, the UE may receive a first DCI at a first time, and may receive a second DCI at a second, later, time. Each DCI may contain scheduling information for uplink or downlink transmissions at the UE. In one example, the first DCI may schedule a first transmission on a first cell, and the second DCI may schedule a second transmission on a second cell, where the second transmission is scheduled to start before or during (e.g., overlapping with) the first scheduled transmission. In some examples, the first and second scheduled transmissions may comprise a data transmission over a physical uplink shared channel (PUSCH). The UE may then determine priorities associated with the first and second cells (e.g., whether the cell is a high priority cell or a low priority cell). In cases where the priority of the second cell is greater than the priority of the first cell, the UE may communicate using the second scheduled transmission before communicating with the first scheduled transmission. In other cases, the UE may puncture or interrupt the first scheduled transmission with the second scheduled transmission based on the priority of the cell associated with the second transmission. In any case, the UE may prioritize transmitting the second scheduled transmission (e.g., the high priority transmission) over the first scheduled transmission (e.g., the lower priority transmission). In some examples, a high priority cell may be associated with a particular service. For instance, ultra-reliable low-latency communications (URLLC) may be associated with a high priority cell, whereas a low priority cell may be associated with enhanced mobile broadband (eMBB) communications.

A method of wireless communications is described. The method may include receiving a first downlink control information scheduling a first downlink transmission, receiving a second downlink control information scheduling a second downlink transmission, where the second downlink transmission is scheduled to start after the first downlink transmission, determining that a first feedback message responsive to the first downlink transmission is scheduled to start no earlier than a second feedback message responsive to the second downlink transmission, the first feedback message being associated with a first cell and the second feedback message being associated with a second cell, determining, based on the first feedback message being scheduled to start no earlier than the second feedback message, that the second cell has a second priority that is greater than a first priority of the first cell, and transmitting the second feedback message based on determining that the second cell has the second priority, where the second feedback message is prioritized over the first feedback message based on the second priority.

An apparatus for wireless communications is described. The apparatus may include a processor, memory in electronic communication with the processor, and instructions stored in the memory. The instructions may be executable by the processor to cause the apparatus to receive a first downlink control information scheduling a first downlink transmission, receive a second downlink control information scheduling a second downlink transmission, where the second downlink transmission is scheduled to start after the first downlink transmission, determine that a first feedback message responsive to the first downlink transmission is scheduled to start no earlier than a second feedback message responsive to the second downlink transmission, the first feedback message being associated with a first cell and the second feedback message being associated with a second cell, determine, based on the first feedback message being scheduled to start no earlier than the second feedback message, that the second cell has a second priority that is greater than a first priority of the first cell, and transmit the second feedback message based on determining that the second cell has the second priority, where the second feedback message is prioritized over the first feedback message based on the second priority.

Another apparatus for wireless communications is described. The apparatus may include means for receiving a first downlink control information scheduling a first downlink transmission, receiving a second downlink control information scheduling a second downlink transmission, where the second downlink transmission is scheduled to start after the first downlink transmission, determining that a first feedback message responsive to the first downlink transmission is scheduled to start no earlier than a second feedback message responsive to the second downlink transmission, the first feedback message being associated with a first cell and the second feedback message being associated with a second cell, determining, based on the first feedback message being scheduled to start no earlier than the second feedback message, that the second cell has a second priority that is greater than a first priority of the first cell, and transmitting the second feedback message based on determining that the second cell has the second priority, where the second feedback message is prioritized over the first feedback message based on the second priority.

A non-transitory computer-readable medium storing code for wireless communications is described. The code may include instructions executable by a processor to receive a first downlink control information scheduling a first downlink transmission, receive a second downlink control information scheduling a second downlink transmission, where the second downlink transmission is scheduled to start after the first downlink transmission, determine that a first feedback message responsive to the first downlink transmission is scheduled to start no earlier than a second feedback message responsive to the second downlink transmission, the first feedback message being associated with a first cell and the second feedback message being associated with a second cell, determine, based on the first feedback message being scheduled to start no earlier than the second feedback message, that the second cell has a second priority that is greater than a first priority of the first cell, and transmit the second feedback message based on determining that the second cell has the second priority, where the second feedback message is prioritized over the first feedback message based on the second priority.

In some examples of the method, apparatuses, and non-transitory computer-readable medium described herein, determining that the second cell may have the second priority may include operations, features, means, or instructions for receiving the second downlink control information via a physical downlink control channel on the second cell, and determining that the second cell may have the second priority based on the physical downlink control channel being on the second cell.

Some examples of the method, apparatuses, and non-transitory computer-readable medium described herein may further include operations, features, means, or instructions for identifying the second cell as a scheduling cell based on a control resource set, a search space, a scrambling sequence, a cell-specific configuration for the second cell, or a combination thereof, where the second priority may be based on the scheduling cell.

In some examples of the method, apparatuses, and non-transitory computer-readable medium described herein, determining that the second cell may have the second priority may include operations, features, means, or instructions for identifying that the second downlink transmission may be scheduled to occur on the second cell based on the second downlink control information, and determining that the second cell may have the second priority based on the second downlink transmission being scheduled on the second cell.

Some examples of the method, apparatuses, and non-transitory computer-readable medium described herein may further include operations, features, means, or instructions for receiving, as part of the second downlink control information, an indication that the second cell may have the second priority.

In some examples of the method, apparatuses, and non-transitory computer-readable medium described herein, the second downlink control information includes a format that excludes a carrier indicator.

Some examples of the method, apparatuses, and non-transitory computer-readable medium described herein may further include operations, features, means, or instructions for receiving the second downlink control information via a physical downlink control channel on the second cell, and identifying that the second downlink transmission may be scheduled to occur on the second cell based on the second downlink control information, where determining that the second cell may have the second priority may be based on the second downlink transmission being scheduled to occur on the second cell, or the physical downlink control channel being received on the second cell, or a combination thereof.

Some examples of the method, apparatuses, and non-transitory computer-readable medium described herein may further include operations, features, means, or instructions for identifying the second cell as a scheduling cell based on a control resource set, a search space, a scrambling sequence, a cell-specific configuration for the second cell, or a combination thereof, where the second priority may be based on the scheduling cell.

Some examples of the method, apparatuses, and non-transitory computer-readable medium described herein may further include operations, features, means, or instructions for determining that the second downlink transmission may be scheduled to occur on a same cell that the second downlink control information may be received on, where the second feedback message may be prioritized over the first feedback message based on the second downlink control information and the second downlink transmission being on the same cell.

Some examples of the method, apparatuses, and non-transitory computer-readable medium described herein may further include operations, features, means, or instructions for determining that the second downlink control information was received on the second cell based on a cell identifier, a scrambling sequence, a control resource set, search space, or a combination thereof, where at least one of the cell identifier, the control resource set, or the search space corresponds to the second cell.

Some examples of the method, apparatuses, and non-transitory computer-readable medium described herein may further include operations, features, means, or instructions for identifying a first set of cells having the first priority and a second set of cells having the second priority, determining a UE capability based on supporting at least a subset of the first set of cells, or a subset of the second set of cells, or a combination thereof, and transmitting, to a base station, a report indicating the determined UE capability.

In some examples of the method, apparatuses, and non-transitory computer-readable medium described herein, determining that the second cell may have the second priority may include operations, features, means, or instructions for receiving, from a base station, an indication that the second cell may have the second priority.

In some examples of the method, apparatuses, and non-transitory computer-readable medium described herein, the indication includes a cell-specific parameter that may be modified via radio resource control signaling.

In some examples of the method, apparatuses, and non-transitory computer-readable medium described herein, the indication includes a cell-specific parameter that may be modified via medium access control (MAC) control element messaging.

In some examples of the method, apparatuses, and non-transitory computer-readable medium described herein, the indication includes a bandwidth part-specific radio resource control parameter.

Some examples of the method, apparatuses, and non-transitory computer-readable medium described herein may further include operations, features, means, or instructions for receiving downlink control information indicating a switch of a bandwidth part, where the second priority may be modified based on the switch of the bandwidth part.

In some examples of the method, apparatuses, and non-transitory computer-readable medium described herein, the second feedback message may be transmitted before the first feedback message, the second feedback message interrupts the first feedback message, the second feedback message preempts the first feedback message, the second feedback message punctures the first feedback message, or a combination thereof.

In some examples of the method, apparatuses, and non-transitory computer-readable medium described herein, the first cell and the second cell include respective cells that may be associated with a same physical cell.

In some examples of the method, apparatuses, and non-transitory computer-readable medium described herein, the first cell and the second cell include respective cells that may be each associated with a different physical cell.

In some examples of the method, apparatuses, and non-transitory computer-readable medium described herein, the first feedback message includes a first hybrid automatic repeat request feedback for the first downlink transmission, and the second feedback message includes a second hybrid automatic repeat request feedback for the second downlink transmission.

In some examples of the method, apparatuses, and non-transitory computer-readable medium described herein, the first feedback message may be associated with a first service type, and the second feedback message may be associated with a second service type.

A method of wireless communications is described. The method may include receiving a first downlink control information scheduling a first transmission associated with a first cell, receiving, no earlier than the first downlink control information, a second downlink control information scheduling a second transmission associated with a second cell, where the second scheduled transmission is scheduled to start before or during the first scheduled transmission, determining, based on the second scheduled transmission being scheduled to start before or during the first scheduled transmission, that the second cell has a second priority that is greater than a first priority of the first cell, and communicating using the second scheduled transmission based on determining that the second cell has the second priority, where the second scheduled transmission is prioritized over the first scheduled transmission based on the second priority.

An apparatus for wireless communications is described. The apparatus may include a processor, memory in electronic communication with the processor, and instructions stored in the memory. The instructions may be executable by the processor to cause the apparatus to receive a first downlink control information scheduling a first transmission associated with a first cell, receive, no earlier than the first downlink control information, a second downlink control information scheduling a second transmission associated with a second cell, where the second scheduled transmission is scheduled to start before or during the first scheduled transmission, determine, based on the second scheduled transmission being scheduled to start before or during the first scheduled transmission, that the second cell has a second priority that is greater than a first priority of the first cell, and communicate using the second scheduled transmission based on determining that the second cell has the second priority, where the second scheduled transmission is prioritized over the first scheduled transmission based on the second priority.

Another apparatus for wireless communications is described. The apparatus may include means for receiving a first downlink control information scheduling a first transmission associated with a first cell, receiving, no earlier than the first downlink control information, a second downlink control information scheduling a second transmission associated with a second cell, where the second scheduled transmission is scheduled to start before or during the first scheduled transmission, determining, based on the second scheduled transmission being scheduled to start before or during the first scheduled transmission, that the second cell has a second priority that is greater than a first priority of the first cell, and communicating using the second scheduled transmission based on determining that the second cell has the second priority, where the second scheduled transmission is prioritized over the first scheduled transmission based on the second priority.

A non-transitory computer-readable medium storing code for wireless communications is described. The code may include instructions executable by a processor to receive a first downlink control information scheduling a first transmission associated with a first cell, receive, no earlier than the first downlink control information, a second downlink control information scheduling a second transmission associated with a second cell, where the second scheduled transmission is scheduled to start before or during the first scheduled transmission, determine, based on the second scheduled transmission being scheduled to start before or during the first scheduled transmission, that the second cell has a second priority that is greater than a first priority of the first cell, and communicate using the second scheduled transmission based on determining that the second cell has the second priority, where the second scheduled transmission is prioritized over the first scheduled transmission based on the second priority.

In some examples of the method, apparatuses, and non-transitory computer-readable medium described herein, determining that the second cell may have the second priority may include operations, features, means, or instructions for receiving the second downlink control information via a physical downlink control channel on the second cell, and determining that the second cell may have the second priority based on the physical downlink control channel being on the second cell.

Some examples of the method, apparatuses, and non-transitory computer-readable medium described herein may further include operations, features, means, or instructions for identifying the second cell as a cell allocating resources for the second scheduled transmission based on a control resource set, a search space, a scrambling sequence, a cell-specific configuration for the second cell, or a combination thereof, where the second priority may be based on the cell allocating the resources.

In some examples of the method, apparatuses, and non-transitory computer-readable medium described herein, determining that the second cell may have the second priority may include operations, features, means, or instructions for identifying that the second scheduled transmission may be scheduled on the second cell based on the second downlink control information, and determining that the second cell may have the second priority based on the second scheduled transmission being scheduled on the second cell.

Some examples of the method, apparatuses, and non-transitory computer-readable medium described herein may further include operations, features, means, or instructions for receiving, as part of the second downlink control information, an indication that the second cell may have the second priority.

In some examples of the method, apparatuses, and non-transitory computer-readable medium described herein, the second downlink control information includes a format that excludes a carrier indicator.

Some examples of the method, apparatuses, and non-transitory computer-readable medium described herein may further include operations, features, means, or instructions for receiving the second downlink control information via a physical downlink control channel on the second cell, and identifying that the second scheduled transmission may be scheduled on the second cell based on the second downlink control information, where determining that the second cell may have the second priority may be based on the second scheduled transmission being scheduled on the second cell, or the physical downlink control channel being received on the second cell, or a combination thereof.

Some examples of the method, apparatuses, and non-transitory computer-readable medium described herein may further include operations, features, means, or instructions for identifying the second cell as a cell allocating resources for the second scheduled transmission based on a control resource set, a search space, a scrambling sequence, a cell-specific configuration for the second cell, or a combination thereof, where the second priority may be based on the cell allocating the resources.

Some examples of the method, apparatuses, and non-transitory computer-readable medium described herein may further include operations, features, means, or instructions for determining that the second scheduled transmission may be scheduled on a same cell that the second downlink control information may be received on, where the second scheduled transmission may be prioritized over the first scheduled transmission based on the second downlink control information and the second scheduled transmission being on the same cell.

Some examples of the method, apparatuses, and non-transitory computer-readable medium described herein may further include operations, features, means, or instructions for determining that the second downlink control information was received on the second cell based on a cell identifier, a scrambling sequence, a control resource set, a search space, or a combination thereof, where at least one of the cell identifier, the control resource set, or the search space corresponds to the second cell.

Some examples of the method, apparatuses, and non-transitory computer-readable medium described herein may further include operations, features, means, or instructions for identifying a first set of cells having the first priority and a second set of cells having the second priority, determining a UE capability based on supporting at least a subset of the first set of cells, or a subset of the second set of cells, or a combination thereof, and transmitting, to a base station, a report indicating the determined UE capability.

In some examples of the method, apparatuses, and non-transitory computer-readable medium described herein, determining that the second cell may have the second priority may include operations, features, means, or instructions for receiving, from a base station, an indication that the second cell may have the second priority.

In some examples of the method, apparatuses, and non-transitory computer-readable medium described herein, the indication includes a cell-specific parameter that may be modified via radio resource control signaling.

In some examples of the method, apparatuses, and non-transitory computer-readable medium described herein, the indication includes a cell-specific parameter that may be modified via medium access control (MAC) control element messaging.

In some examples of the method, apparatuses, and non-transitory computer-readable medium described herein, the indication includes a bandwidth part-specific radio resource control parameter.

Some examples of the method, apparatuses, and non-transitory computer-readable medium described herein may further include operations, features, means, or instructions for receiving downlink control information indicating a switch of a bandwidth part, where the second priority may be modified based on the switch of the bandwidth part.

In some examples of the method, apparatuses, and non-transitory computer-readable medium described herein, the second scheduled transmission may be communicated before the first scheduled transmission, the second scheduled transmission interrupts the first scheduled transmission, the second scheduled transmission preempts the first scheduled transmission, the second scheduled transmission punctures the first scheduled transmission, or a combination thereof In some examples of the method, apparatuses, and non-transitory computer-readable medium described herein, the first cell and the second cell include respective virtual cells that may be associated with a same physical cell.

In some examples of the method, apparatuses, and non-transitory computer-readable medium described herein, the first cell and the second cell include respective virtual cells that may be each associated with a different physical cell.

In some examples of the method, apparatuses, and non-transitory computer-readable medium described herein, the first scheduled transmission includes a first physical downlink shared channel, and the second scheduled transmission includes a second physical downlink shared channel for a second downlink transmission.

In some examples of the method, apparatuses, and non-transitory computer-readable medium described herein, the first scheduled transmission includes a first physical uplink shared channel, and the second scheduled transmission includes a second physical uplink shared channel.

In some examples of the method, apparatuses, and non-transitory computer-readable medium described herein, the first scheduled transmission may be associated with a first service type, and the second scheduled transmission may be associated with a second service type.

A method of wireless communications is described. The method may include identifying a first priority for a first cell and a second priority for a second cell, where the second priority is greater than the first priority, transmitting, to a UE, a first downlink control information scheduling a first downlink transmission, transmitting, to the UE, a second downlink control information scheduling a second downlink transmission, transmitting the first scheduled downlink transmission before the second scheduled downlink transmission, and receiving a second feedback message associated with the second cell, the second feedback message being prioritized over a first feedback message based on the second priority, where the first feedback message is responsive to the first scheduled downlink transmission and the second feedback message is responsive to the second scheduled downlink transmission.

An apparatus for wireless communications is described. The apparatus may include a processor, memory in electronic communication with the processor, and instructions stored in the memory. The instructions may be executable by the processor to cause the apparatus to identify a first priority for a first cell and a second priority for a second cell, where the second priority is greater than the first priority, transmit, to a UE, a first downlink control information scheduling a first downlink transmission, transmit, to the UE, a second downlink control information scheduling a second downlink transmission, transmit the first scheduled downlink transmission before the second scheduled downlink transmission, and receive a second feedback message associated with the second cell, the second feedback message being prioritized over a first feedback message based on the second priority, where the first feedback message is responsive to the first scheduled downlink transmission and the second feedback message is responsive to the second scheduled downlink transmission.

Another apparatus for wireless communications is described. The apparatus may include means for identifying a first priority for a first cell and a second priority for a second cell, where the second priority is greater than the first priority, transmitting, to a UE, a first downlink control information scheduling a first downlink transmission, transmitting, to the UE, a second downlink control information scheduling a second downlink transmission, transmitting the first scheduled downlink transmission before the second scheduled downlink transmission, and receiving a second feedback message associated with the second cell, the second feedback message being prioritized over a first feedback message based on the second priority, where the first feedback message is responsive to the first scheduled downlink transmission and the second feedback message is responsive to the second scheduled downlink transmission.

A non-transitory computer-readable medium storing code for wireless communications is described. The code may include instructions executable by a processor to identify a first priority for a first cell and a second priority for a second cell, where the second priority is greater than the first priority, transmit, to a UE, a first downlink control information scheduling a first downlink transmission, transmit, to the UE, a second downlink control information scheduling a second downlink transmission, transmit the first scheduled downlink transmission before the second scheduled downlink transmission, and receive a second feedback message associated with the second cell, the second feedback message being prioritized over a first feedback message based on the second priority, where the first feedback message is responsive to the first scheduled downlink transmission and the second feedback message is responsive to the second scheduled downlink transmission.

In some examples of the method, apparatuses, and non-transitory computer-readable medium described herein, transmitting the second downlink control information may include operations, features, means, or instructions for transmitting the second downlink control information via a physical downlink control channel on the second cell, where the second cell may have the second priority based on the physical downlink control channel being on the second cell.

Some examples of the method, apparatuses, and non-transitory computer-readable medium described herein may further include operations, features, means, or instructions for configuring the second cell as a cell allocating resources for the second scheduled downlink transmission, where the configuration includes a control resource set, a search space, a scrambling sequence, a cell-specific configuration for the second cell, or a combination thereof, where the second priority may be based on the cell allocating the resources.

Some examples of the method, apparatuses, and non-transitory computer-readable medium described herein may further include operations, features, means, or instructions for scheduling the second scheduled downlink transmission on the second cell, where the second cell may have the second priority based on the second downlink transmission being scheduled on the second cell.

Some examples of the method, apparatuses, and non-transitory computer-readable medium described herein may further include operations, features, means, or instructions for configuring the second downlink control information using a format that excludes a carrier indicator, and transmitting, as part of the second downlink control information, an indication that the second cell may have the second priority based on the format.

Some examples of the method, apparatuses, and non-transitory computer-readable medium described herein may further include operations, features, means, or instructions for transmitting the second downlink control information via a physical downlink control channel on the second cell, and scheduling the second scheduled downlink transmission on the second cell, where the second cell may have the second priority based on the second scheduled downlink transmission being on the second cell, or the physical downlink control channel being transmitted on the second cell, or a combination thereof.

Some examples of the method, apparatuses, and non-transitory computer-readable medium described herein may further include operations, features, means, or instructions for scheduling the second scheduled downlink transmission on a same cell that the second downlink control information may be transmitted on, where the second feedback message may be prioritized over the first feedback message based on the second downlink control information and the second scheduled downlink transmission being on the same cell.

Some examples of the method, apparatuses, and non-transitory computer-readable medium described herein may further include operations, features, means, or instructions for indicating, to the UE, that the second downlink control information may be transmitted on the second cell, the indication including a cell identifier, a scrambling sequence, a control resource set, a search space, or a combination thereof, where at least one of the cell identifier, the control resource set, or the search space corresponds to the second cell.

Some examples of the method, apparatuses, and non-transitory computer-readable medium described herein may further include operations, features, means, or instructions for receiving, from the UE, a report including a UE capability, the UE capability including an indication that the UE supports at least a subset of a first set of cells having the first priority, or at least subset of a second set of cells having the second priority, or a combination thereof, and transmitting the first downlink control information and the second downlink control information based on the UE capability.

Some examples of the method, apparatuses, and non-transitory computer-readable medium described herein may further include operations, features, means, or instructions for transmitting, to the UE, an indication that the second cell may have the second priority.

In some examples of the method, apparatuses, and non-transitory computer-readable medium described herein, the indication includes a cell-specific parameter that may be modified via radio resource control signaling, a cell-specific parameter that may be modified via medium access control (MAC) control element messaging, a bandwidth part-specific radio resource control parameter, or a combination thereof.

Some examples of the method, apparatuses, and non-transitory computer-readable medium described herein may further include operations, features, means, or instructions for transmitting downlink control information indicating a switch of a bandwidth part, where the second priority may be modified based on the switch of the bandwidth part.

In some examples of the method, apparatuses, and non-transitory computer-readable medium described herein, the second feedback message may be received before the first feedback message, the second feedback message interrupts the first feedback message, the second feedback message preempts the first feedback message, the second feedback message punctures the first feedback message, or a combination thereof.

In some examples of the method, apparatuses, and non-transitory computer-readable medium described herein, the first feedback message includes a first hybrid automatic repeat request feedback for the first downlink transmission, and the second feedback message includes a second hybrid automatic repeat request feedback for the second downlink transmission.

A method of wireless communications is described. The method may include identifying a first priority for a first cell and a second priority for a second cell, where the second priority is greater than the first priority, transmitting a first downlink control information scheduling a first transmission associated with the first cell, transmitting, after the first downlink control information, a second downlink control information scheduling a second transmission associated with the second cell, and communicating using the second scheduled transmission, where the second scheduled transmission is prioritized over the first scheduled transmission based on the second priority.

An apparatus for wireless communications is described. The apparatus may include a processor, memory in electronic communication with the processor, and instructions stored in the memory. The instructions may be executable by the processor to cause the apparatus to identify a first priority for a first cell and a second priority for a second cell, where the second priority is greater than the first priority, transmit a first downlink control information scheduling a first transmission associated with the first cell, transmit, after the first downlink control information, a second downlink control information scheduling a second transmission associated with the second cell, and communicate using the second scheduled transmission, where the second scheduled transmission is prioritized over the first scheduled transmission based on the second priority.

Another apparatus for wireless communications is described. The apparatus may include means for identifying a first priority for a first cell and a second priority for a second cell, where the second priority is greater than the first priority, transmitting a first downlink control information scheduling a first transmission associated with the first cell, transmitting, after the first downlink control information, a second downlink control information scheduling a second transmission associated with the second cell, and communicating using the second scheduled transmission, where the second scheduled transmission is prioritized over the first scheduled transmission based on the second priority.

A non-transitory computer-readable medium storing code for wireless communications is described. The code may include instructions executable by a processor to identify a first priority for a first cell and a second priority for a second cell, where the second priority is greater than the first priority, transmit a first downlink control information scheduling a first transmission associated with the first cell, transmit, after the first downlink control information, a second downlink control information scheduling a second transmission associated with the second cell, and communicate using the second scheduled transmission, where the second scheduled transmission is prioritized over the first scheduled transmission based on the second priority.

In some examples of the method, apparatuses, and non-transitory computer-readable medium described herein, transmitting the second downlink control information may include operations, features, means, or instructions for transmitting the second downlink control information via a physical downlink control channel on the second cell, where the second cell may have the second priority based on the physical downlink control channel being on the second cell.

Some examples of the method, apparatuses, and non-transitory computer-readable medium described herein may further include operations, features, means, or instructions for configuring the second cell as a cell allocating resources for the second scheduled transmission, where the configuration includes a control resource set, a search space, a scrambling sequence, a cell-specific configuration for the second cell, or a combination thereof, where the second priority may be based on the cell allocating the resources.

Some examples of the method, apparatuses, and non-transitory computer-readable medium described herein may further include operations, features, means, or instructions for scheduling the second scheduled transmission on the second cell, where the second cell may have the second priority based on the second scheduled transmission being scheduled on the second cell.

Some examples of the method, apparatuses, and non-transitory computer-readable medium described herein may further include operations, features, means, or instructions for configuring the second downlink control information using a format that excludes a carrier indicator, and transmitting, as part of the second downlink control information, an indication that the second cell may have the second priority based on the format.

Some examples of the method, apparatuses, and non-transitory computer-readable medium described herein may further include operations, features, means, or instructions for transmitting the second downlink control information via a physical downlink control channel on the second cell, and scheduling the second scheduled transmission on the second cell, where the second cell may have the second priority based on the second scheduled transmission being on the second cell, or the physical downlink control channel being transmitted on the second cell, or a combination thereof.

Some examples of the method, apparatuses, and non-transitory computer-readable medium described herein may further include operations, features, means, or instructions for scheduling the second scheduled transmission on a same cell as the second downlink control information, where the second scheduled transmission may be prioritized over the first scheduled transmission based on the second downlink control information and the second scheduled downlink transmission being on the same cell.

Some examples of the method, apparatuses, and non-transitory computer-readable medium described herein may further include operations, features, means, or instructions for indicating, to the UE, that the second downlink control information may be transmitted on the second cell, the indication including a cell identifier, a scrambling sequence, a control resource set, a search space, or a combination thereof, where at least one of the cell identifier, the control resource set, or the search space corresponds to the second cell.

Some examples of the method, apparatuses, and non-transitory computer-readable medium described herein may further include operations, features, means, or instructions for receiving, from the UE, a report including a UE capability, the UE capability including an indication that the UE supports at least a subset of a first set of cells having the first priority, or at least subset of a second set of cells having the second priority, or a combination thereof, and transmitting the first downlink control information and the second downlink control information based on the UE capability.

Some examples of the method, apparatuses, and non-transitory computer-readable medium described herein may further include operations, features, means, or instructions for transmitting, to the UE, an indication that the second cell may have the second priority.

In some examples of the method, apparatuses, and non-transitory computer-readable medium described herein, the indication includes a cell-specific parameter that may be modified via radio resource control signaling, a cell-specific parameter that may be modified via medium access control (MAC) control element messaging, a bandwidth part-specific radio resource control parameter, or a combination thereof.

Some examples of the method, apparatuses, and non-transitory computer-readable medium described herein may further include operations, features, means, or instructions for transmitting downlink control information indicating a switch of a bandwidth part, where the second priority may be modified based on the switch of the bandwidth part.

In some examples of the method, apparatuses, and non-transitory computer-readable medium described herein, the second scheduled transmission may be received before the first scheduled transmission, the second scheduled transmission interrupts the first scheduled transmission, the second scheduled transmission preempts the first scheduled transmission, the second scheduled transmission punctures the first scheduled transmission, or a combination thereof.

In some examples of the method, apparatuses, and non-transitory computer-readable medium described herein, the first scheduled transmission includes a first physical downlink shared channel, and the second scheduled transmission includes a second physical downlink shared channel for a second downlink transmission.

In some examples of the method, apparatuses, and non-transitory computer-readable medium described herein, the first scheduled transmission includes a first physical uplink shared channel, and the second scheduled transmission includes a second physical uplink shared channel.

DETAILED DESCRIPTION

Figure 1:
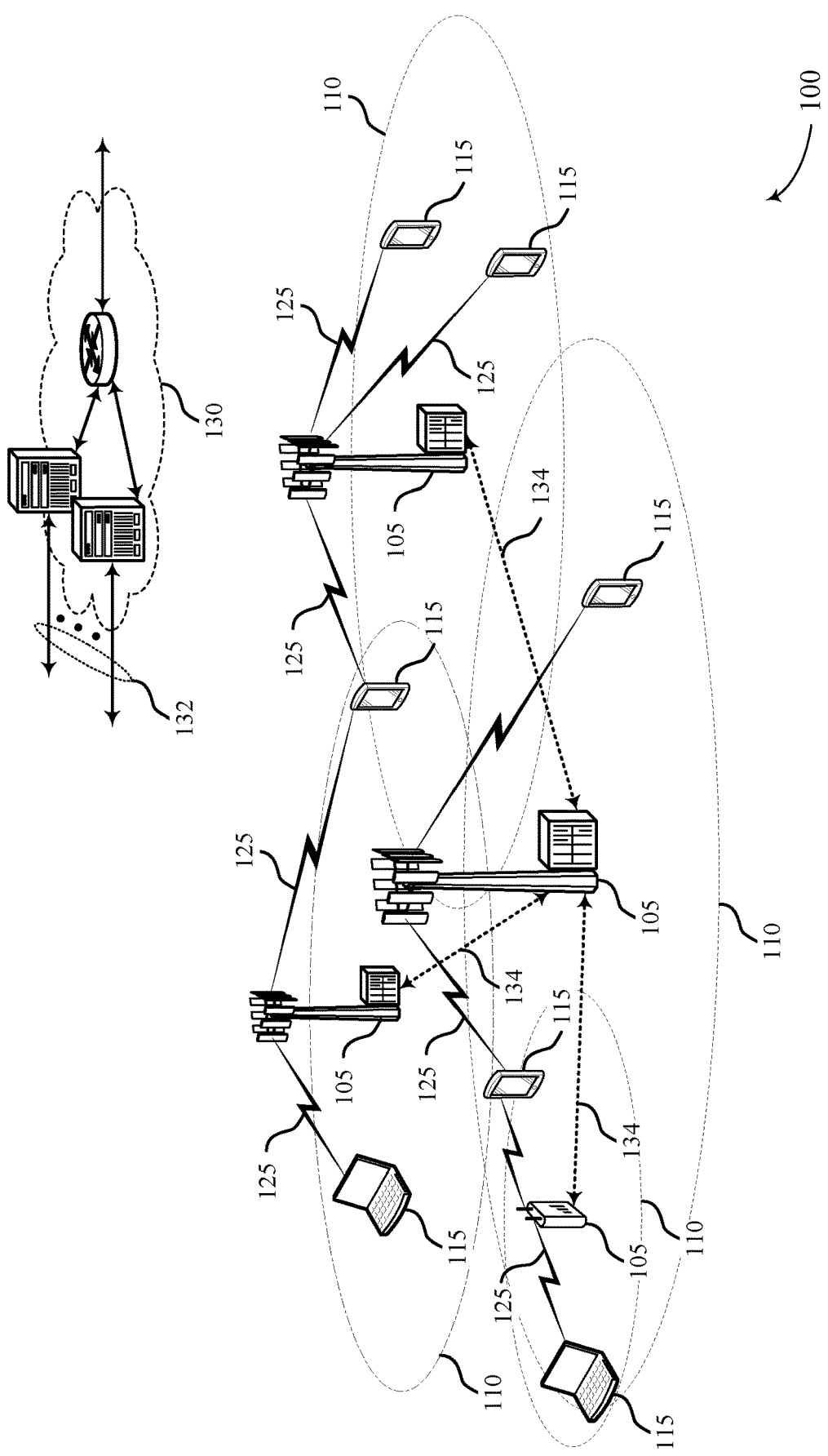
FIG. 1 illustrates an example of a system for wireless communications that supports cell-based transmission priority in accordance with aspects of the present disclosure.

A user equipment (UE) may perform various communications based on resource grant scheduling transmissions. As an example, a UE may be scheduled with one or more transmissions based on received resource grants, where the transmissions may occur at respective times based on the resources indicated. In some cases, the UE may follow the timing indicated by downlink control information (DCI), where an uplink or downlink transmission may occur at a certain period of time (e.g., symbols, slots) after the DCI is received. Additionally or alternatively, hybrid automatic repeat request (HARQ) feedback may, for example, be transmitted a certain number of symbols after a downlink transmission is received. In some cases, however, it may be advantageous for the UE to perform out-of-order communications (such as out-of-order HARQ-acknowledgment (ACK)) in order to reduce the latency of data transmission at the UE. For instance, certain services may be sensitive to latency, and it may therefore be advantageous to prioritize communications for those services regardless of the scheduled transmission times.

In some cases, the UE may receive a first DCI which schedules a first downlink transmission at a first time, and may receive a second DCI which schedules a second downlink transmission at a second time. The UE may respond to the first downlink transmission using a first HARQ-ACK process associated with a first cell. UE 115-a may similarly respond to the second downlink transmission using a second HARQ-ACK process associated with a second cell. In one example, the UE may determine that the second HARQ-ACK process is scheduled before the first HARQ-ACK process (e.g., in accordance with a timing between the received downlink transmission and a time when HARQ-ACK may be transmitted). In such cases, the UE may need to utilize techniques that enable the UE to efficiently communicate the second HARQ-ACK irrespective of the order in which HARQ-ACK is to be transmitted (e.g., based on when the respective downlink transmissions were received).

As described herein, the UE may perform out-of-order transmissions based on a priority of a cell that is associated with a transmission. For instance, the UE may identify a priority of the first cell and a priority of the second cell associated with the HARQ processes, and may determine that the priority of the second cell is greater than the priority of the first cell. As a result, the UE may prioritize the second HARQ-ACK process and may transmit HARQ-ACK for the second downlink transmission before sending HARQ-ACK for the first downlink transmission. The techniques described may allow for out-of-order HARQ-ACK such that the UE may not need to wait to transmit HARQ-ACK or other transmissions based on the arrival time of associated scheduling control information. This may decrease the latency for transmissions at the UE.

In another example, the UE may be capable of simultaneously communicating, according to various services, where different services may be associated with different communications priorities. That is, the UE may support both high priority and low priority services. For example, the UE may communicate using enhanced mobile broadband (eMBB), ultra-reliable low-latency communication (URLLC), and so on. The URLLC communications may indicate high priority traffic, while eMBB communications may indicate low priority traffic (e.g., traffic with a lesser priority than that transmitted using URLLC).

In some cases, the UE may receive a first DCI for a first scheduled uplink transmission (e.g., a PUSCH) at a first time, and may receive a second DCI for a second scheduled uplink transmission at a second, later time. In some examples, the first scheduled transmission may be associated with eMBB communications, and the second scheduled transmission may be associated with URLLC communications. Additionally, the second scheduled transmission may be scheduled at a time before or during the first scheduled transmission. In some cases, the UE may identify a scheduling overlap between the first and second scheduled transmissions, and may identify the priority of cells associated with the scheduled transmissions. The UE may further transmit the first and second transmissions based on the identified priorities. For example, the UE may determine that the second transmission (e.g., URLLC) is associated with a cell containing high priority traffic. The UE may then determine that the first scheduled transmission (e.g., eMBB) is associated with a cell containing low priority traffic (e.g., the second cell has a priority greater than that of the first cell). Accordingly, the UE may transmit the second scheduled transmission before the completion of the ongoing first scheduled transmission based on the determined priorities. As a result, the UE may transmit the second scheduled transmission during the ongoing first scheduled transmission, or may otherwise interrupt the first scheduled transmission. Such techniques may allow for UE 115-a to handle overlapping scheduled transmissions.

Aspects of the disclosure are initially described in the context of a wireless communications system, and are further illustrated by and described with reference to apparatus diagrams, system diagrams, and flowcharts that relate to cell-based transmission priority.

FIG. 1 illustrates an example of a wireless communications system 100 that supports cell-based transmission priority in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In a first example, UE 115 may receive a first DCI at a first time, and then may receive a second DCI at a second time. The time at which UE 115 receives the second DCI may be later than the time at which it receives the first DCI. Each DCI may contain scheduling information for scheduling a number of transmissions. In one case, a downlink transmission associated with the first DCI may be scheduled on a first cell, and may be scheduled to occur before a downlink transmission associated with the second DCI scheduled on a second cell. UE 115 may then determine a priority associated with the first cell, and a priority associated with the second cell (e.g., to determine whether the cell is a high priority cell or a low priority cell). In cases where the priority of the second cell is greater than the priority of the first cell, UE 115 may transmit HARQ-ACK (e.g., ACK/NACK) for the second scheduled downlink transmission before it transmits HARQ-ACK for the first scheduled downlink transmission. This way, the UE may prioritize transmitting HARQ-ACK feedback for the second scheduled downlink transmission without waiting for HARQ-ACK feedback for the first scheduled downlink transmission to occur.

In a second example, UE 115 may receive a first DCI at a first time, and may receive a second DCI at a second time after the time it receives the first DCI. Each DCI may contain scheduling information for scheduling transmissions at the UE 115. In one example, the second DCI may schedule a second transmission on a second cell to start before or during the time at which the first DCI scheduled the first transmission on a first cell. In some examples, the first and second scheduled transmissions may be PUSCH transmissions. UE 115 may then determine priorities associated with the first and second cells (e.g., whether the cell is a high priority cell or a low priority cell). In cases where the priority of the second cell is greater than the priority of the first cell, the UE may communicate using the second scheduled transmission before communicating with the first scheduled transmission. As a result, the UE may prioritize transmitting the second scheduled transmission (e.g., the high priority transmission) over the first scheduled transmission (e.g., the lower priority transmission).

In some cases, the techniques described herein may extend the battery life of a device such as UE 115 by enabling more efficient scheduling of transmissions with less buffer time based on their associated priorities. In addition, the described techniques may improve overall user experience by decreasing latency of high priority transmissions, such that high priority data may be sent (or received) before or during subsequent transmission of low priority data. Accordingly, the reliability of transmissions in accordance with a particular service may be improved.

Figure 2:
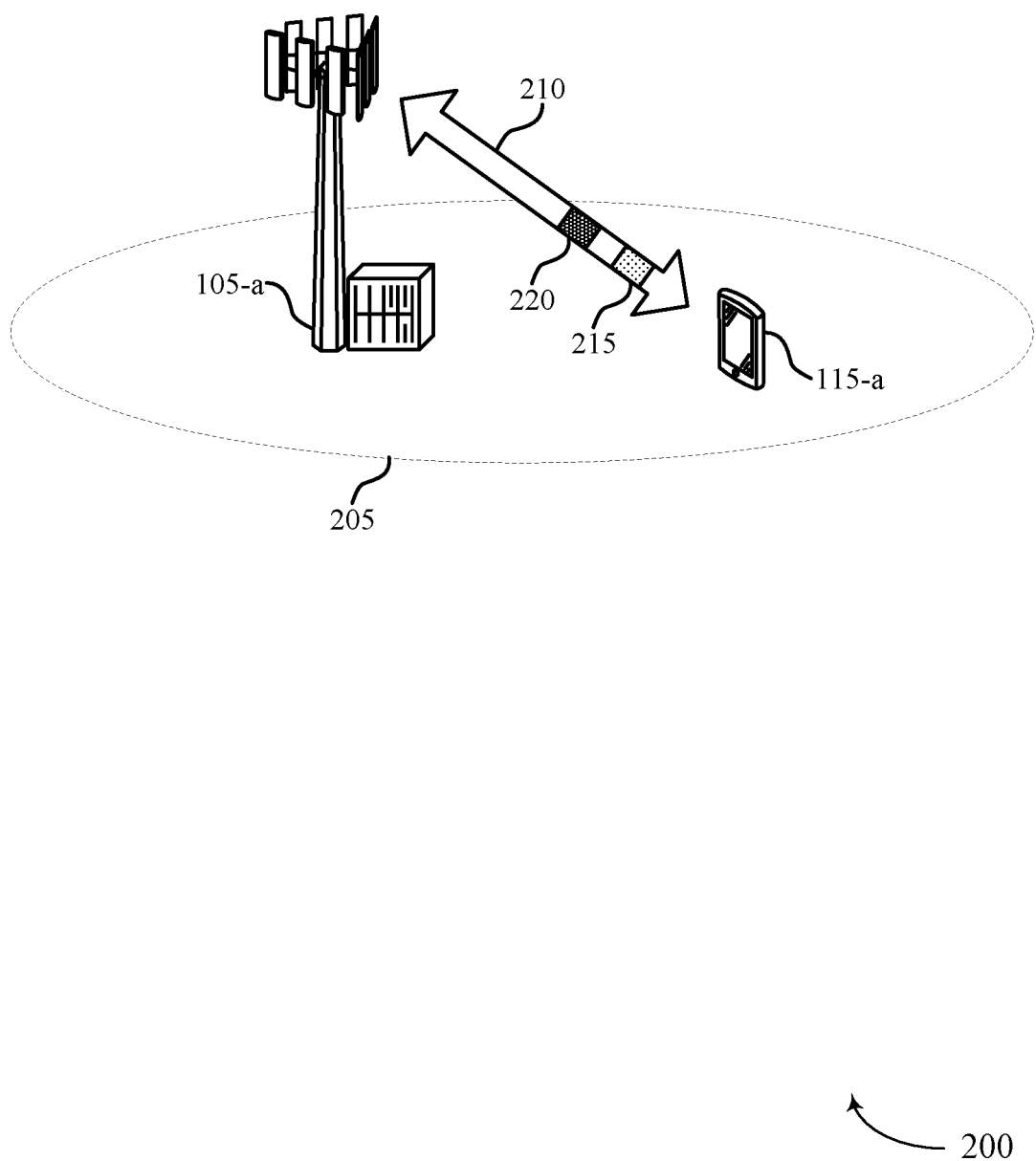
FIG. 2 illustrates an example of a wireless communication system that supports cell-based transmission priority in accordance with aspects of the present disclosure.

FIG. 2 illustrates an example of a wireless network 200 that supports cell-based transmission priority in accordance with aspects of the present disclosure. In some examples, wireless network 200 may implement aspects of wireless communications system 100. Wireless network 200 may include base station 105-*a* and UE 115-*a*, which may be respective examples of a base station 105 and a UE 115 as described herein. Both base station 105-*a* and UE 115-*a* may be associated with physical cell 205.

UE 115-*a* and base station 105-*a* may communicate via communication link 210 according to various signaling methods. UE 115-*a* may receive a number of physical downlink control channel (PDCCH) transmissions which may include control information (e.g., DCI) to schedule or allocate resources for a number of corresponding data transmissions such as hybrid automatic repeat request acknowledgement (HARQ-ACK) information, scheduled PUSCH transmissions, and so on. UE 115-*a* may also receive a number of physical downlink shared channel (PDSCH) transmissions from base station 105-*a*. In some cases, UE 115-*a* may receive a first DCI 215 scheduling first downlink transmission at a first time, and may receive a second DCI 220 scheduling a second downlink transmission at a second time.

The UE 115-*a* may respond to the first downlink transmission using a first HARQ-ACK process (e.g., a second HARQ-ACK process identifier) associated with a first cell. UE 115-*a* may similarly respond to the second downlink transmission using a second HARQ-ACK process (e.g., a second HARQ-ACK process identifier) associated with a second cell. In some cases, the UE 115-*a* may determine that the second HARQ-ACK process is scheduled before the first HARQ-ACK transmission, and may identify a priority of the first cell and a priority of the second cell. In some examples, UE 115-*a* may determine that the priority of the second cell is greater than the priority of the first cell, and the UE 115-*a* may transmit HARQ-ACK for the second downlink transmission before sending HARQ-ACK for the first downlink transmission.

The techniques described may allow for out-of-order HARQ-ACK such that a UE 115-*a* may not need to wait to transmit HARQ-ACK or other transmissions based on the arrival timing of associated scheduling control information. This may decrease the latency for transmissions at a UE 115-*a* which is capable of supporting a number of different communication services or use cases.

According to one aspect, UE 115-*a* may be configured to support communications using mixed services. For example, UE 115-*a* may be configured to communicate using enhanced mobile broadband (eMBB), ultra-reliable low-latency communication (URLLC), and so on. In some cases, URLLC communications may indicate high priority traffic, while eMBB communications may indicate low priority traffic (e.g., traffic with a lesser priority than that transmitted using URLLC).

UE 115-*a* may receive a grant in DCI 215 for a first scheduled transmission (e.g., a PUSCH) at a first time, and may receive a second grant in DCI 220 for a second scheduled transmission at a second, later, time. In some examples, the first scheduled transmission may be associated with eMBB communications, and the second scheduled transmission may be associated with URLLC communications. Additionally, the second scheduled transmission may be scheduled at a time before or during the first scheduled transmission. As a result, UE 115-*a* may transmit a packet or other data in the second scheduled transmission during the ongoing first scheduled transmission. For example, UE 115-*a* may have URLLC data to transmit during an ongoing eMBB transmission. In some cases, UE 115-*a* may identify a scheduling overlap between scheduled transmissions, and may identify the priority of cells associated with the scheduled transmissions and may further transmit the transmissions based on the identified priorities. For example, UE 115-*a* may determine that the second transmission (e.g., URLLC) is associated with a cell for high priority traffic. The UE 115-*a* may further determine that the first scheduled transmission (e.g., eMBB) is associated with a cell for low priority traffic (e.g., the second cell has a priority greater than that of the first cell). UE 115-*a* may then transmit the second scheduled transmission (e.g., URLLC) before the completion of the ongoing first scheduled transmission (e.g., eMBB) based on the determined priorities. Such techniques may allow for UE 115-*a* to handle overlapping scheduled transmissions. In such examples, high priority traffic may interrupt low priority traffic, but low priority traffic may not be able to interrupt high priority traffic.

In one example, UE 115-*a* may receive a first grant in DCI 215 for a first downlink transmission, and may receive the associated first downlink transmission at a first time. In some examples, the first downlink transmission may be associated with eMBB communications. After beginning the receipt the first downlink transmission, UE 115-*a* may receive a second grant in DCI 220 for a second downlink transmission (e.g., URLLC) along with a downlink preemption indicator for the second downlink transmission (e.g., an indication that the data allocated for the second downlink transmission is corrupted). In some cases, UE 115-*a* may need to wait for the full first downlink transmission and its associated HARQ-ACK process to complete before sending a negative acknowledgement (NACK) for the corrupted second downlink transmission, which may cause increased latency. However, using methods described herein, the UE 115-*a* may send a NACK for the corrupted second downlink transmission during the ongoing first downlink transmission, even though DCI 220 and the associated PDCCH for the second downlink transmission was received after DCI 215 and the associated PDCCH for the first downlink transmission.

In another example, UE 115-*a* may receive a first grant in DCI 215 scheduling a first uplink transmission, and may transmit the associated first uplink transmission at a first time according to scheduling information contained in DCI 215. In some examples, the first uplink transmission may be associated with eMBB communications. After beginning to transmit the first downlink transmission, UE 115-*a* may receive a second grant in DCI 220 for a second uplink transmission. In some examples, the second uplink transmission may be associated with URLLC communications, and may include high priority data. In some cases, UE 115-*a* may need to wait for the full first uplink transmission and its associated HARQ-ACK process to complete before sending the high priority URLLC data which may cause increased latency. However, using methods described herein, the UE 115-a may send the second uplink transmission during the ongoing first uplink transmission, even though DCI 220 and the associated PDCCH for scheduling the second uplink transmission was received after DCI 215 and the associated PDCCH for the first uplink transmission.

In some examples, the transmissions (e.g., URLLC and eMBB transmissions) may be scheduled close enough in time such that the associated traffic may be multiplexed together. UE 115-a may use preemptive scheduling, semi persistent scheduling, pause-resume schemes, and the like to effectively allocate resources. In some cases, the multiplexed transmissions may comply with different timing rules than transmissions that have not been multiplexed.

Various scheduling processes and resource allocation may be defined in part by scheduling DCI, for example, DCI 215 and DCI 220. In some cases, however, UE 115-a may receive a PDCCH scheduling a high priority transmission (e.g., a URLLC transmission) without receiving a scheduling DCI for the high priority transmission. UE 115-a may determine to interrupt an ongoing low priority transmission (e.g., an eMBB) transmission with the high priority transmission, independent of whether the PDSCH for high priority transmission is scheduled by DCI or an SPS, and so on.

The following examples describe cell-based transmission priority and associated HARQ-ACK processes as related to PDSCH, however it is to be understood that the following descriptions may be extend to other channels and transmission directions as well (e.g., PUSCH).

In one example, UE 115-a may receive a first DCI 215 indicating scheduling for a first transmission (for example, using eMBB). Then, UE 115-a may receive a second DCI 220 scheduling a second transmission (for example, using URLLC) during a time which overlaps with the first transmission timing. In such examples, UE 115-a may determine transmission timing based on certain priority rules or an explicit priority indication. In the case of indicating an explicit priority, UE 115-a may support switching between a high priority configuration to low priority configuration based on a priority indication or other parameters it may receive (e.g., bandwidth allocation, scheduling, etc.). Switching between a high-priority and low priority configurations may save power and be less costly on hardware at the UE 115-a, among other advantages. The priority indication may, in some examples, include a radio network temporary identifier (RNTI), a cyclic redundancy check (CRC) mask indication in DCI, a bit present in DCI indicating high or low priority, and so on. In other cases, transmission priorities may be associated with a cell or a component carrier on which the traffic is scheduled or transmitted. For example, a cell or component carrier may be designated as a high priority cell or as a low priority cell. In some cases, there may be a number of cells designated as high priority and a number of cells designated as low priority.

In some cases, the cells may be spatially separate physical cells. In other cases, the cells may be virtual cells, where a number of virtual cells may correspond or map to a same physical cell (e.g., multiple virtual cells may be associated with a single physical cell 205) or a different physical cell. In some examples, virtual cells and associated different sections of a physical cell may have different cell IDs, and may be scheduled (e.g., in a scheduling DCI) using separate cell IDs. For example, one virtual cell associated with a first physical cell may be designated as a low priority, while another virtual cell associated with the same first physical cell may be designated as high priority. In such examples, the virtual cells may be viewed as distinct cells and may indicate transmission priority if both high priority and low priority cells correspond to the same physical cell. In other examples, the virtual cells may not correspond to the same physical cell. In further examples, two virtual cells that map to the same physical cell may have different configurations. For example, a base station 105-a may configure the control region for one virtual cell to be smaller than the other, and may configure the cell in a number of configurations. As a result, a high priority virtual cell corresponding to a physical cell may preempt a transmission on a low priority virtual cell corresponding to the same or a separate physical cell. The priority indication is thus given as a virtual cell.

In a first example, the priority of a transmission may be determined based on the designated priority of the cell in which a scheduling PDCCH is initially received, and may be determined based on downlink control (e.g., DCI) or other downlink signaling. There are a number ways in which UE 115-a may identify the cell that receives the scheduling PDCCH. For example, the cell may be identified or distinguished based on one or more of: a control resource set (CORESET), search space, scrambling, or any other cell-specific configuration that is distinct between the cells, and the like.

In other examples, the priority of the transmission may be determined based on which cell a PDSCH or PUSCH is received or transmitted on. In some examples, UE 115-a may receive DCI 215 via a downlink channel transmission (e.g., PDCCH). In some cases, DCI 215 may include a carrier indicator or other indication that UE 115-a may use to determine a location of the PDSCH or the PUSCH (e.g., whether the PDSCH/PUSCH is on the same cell as the PDCCH). In other cases, the DCI 215 may not include a carrier indicator, and the PUSCH may be scheduled on the same component carrier as the PDCCH is received, and may be scheduled using the same transmission priority as the PDCCH.

In some examples, a radio resource control (RRC) indication may be used to indicate the priority of a cell, and a number of RRC parameters may configure the cell. In one example, an RRC parameter may explicitly indicate a cell as a high priority or low priority cell. In cases where UE 115-a receives PDCCH on a high priority cell, UE 115-a may interrupt an ongoing transmission on a low priority cell. In some cases, the RRC configuration of the cell may indicate whether a scheduled PUSCH transmission on the cell is high priority (e.g., URLLC) or whether it is low priority (e.g., EMBB). In this case, priority may be allocated based on the configuration of the cell that the PDCCH is received.

Additionally or alternatively, the priority of a transmission may be determined based on the cell in which the scheduling PDCCH is initially received, in addition to which cell the PDSCH or PUSCH is received or transmitted on. In such cases, UE 115-a may receive data or control information corresponding to a high priority cell indicating a scheduled high priority transmission. In some other examples, both data and control information may be received on the high priority cell, or on a number of high priority cells. In this case, the scheduled cell may be identified or distinguished based on one or more of a CORESET, search space, scrambling, or any other cell-specific configuration that is distinct across separate cells.

In some cases, UE 115-a may assume a low priority transmission for transmissions scheduled using cross-carrier scheduling. In addition, if UE 115-a is self-scheduled, both data and control information may be included on the same cell (e.g., if the PDCCH is on the same cell as the PDSCH/ PUSCH), and UE 115-a may use the self-scheduled cell configuration to indicate high priority or low priority transmissions.

In other cases, UE 115-a may receive a downlink transmission with an associated scheduling DCI format. The DCI format may, in some examples, include a carrier indicator. In other examples, the DCI format may not include a carrier indicator. In examples where the DCI format does not include a carrier indicator, an explicit field indicating the priority of the transmissions may alternatively be included with the DCI format. As a result, UE 115-a may be self-scheduled on the same carrier, or a specific field in DCI may be used to indicate transmission priority. Such an addition of an explicit field may allow for virtual cross carrier scheduling, but may not allow for cross component scheduling of distinct physical cells for carrier formats that lack a carrier indicator.

UE 115-a may also assume configurations of high priority and low priority cells to be distinct in order to determine where DCI was received. UE 115-a may differentiate cells (e.g., as physical or virtual cells) based on one or more cell parameters such as cell ID, scrambling, disjoint CORESETs or monitoring occasions, distinct search space configurations, and so on.

In some aspects, UE 115-a may communicate with a base station 105-a that it is able to support both high priority and low priority transmissions simultaneously. For example, during capability reporting, UE 115-a may notify the base station of a carrier aggregation (CA) configuration, which may include the number of high priority cells it may support in addition to the number of low priority cells it may support. The total number of cells UE 115-a may support in a given band or band combination may be different from the actual combination of high and low priority cells UE 115-a may report for the band or band combination. In some cases, the number of cells UE 115-a may support may be based on a number of factors, such as resources allocated to the UE, capabilities of the UE, and so on. In one example, UE 115-a may indicate a capability of supporting 4 low priority cells on a given band, but may report a different number of cells including combinations of both high and low priority cells according to the CA configuration. For example, the UE may report 4 low priority cells in one case, or 2 low priority cells and 1 high priority cell in another case, or 2 high priority cells in another case, and so on. Capability reporting at UE 115-a may reduce the number of high priority transmissions UE 115-a may perform, and may aid in power savings.

In some other cases, cell priority indication may be transmitted by a base station (e.g., base station 105-a). In one example, the cell priority indication may be a cell-specific parameter indicated by an RRC configuration, and may be changed by an RRC reconfiguration. In another example, the cell priority indication may be a bandwidth part-specific RRC parameter. As a result, the RRC may enable the cell to dynamically change priority within some period. In addition, a DCI may indicate a change in the bandwidth part to indicate a change of priority of the cell (e.g., the priority changes as the bandwidth part changes). In another example, the cell priority indication may be a cell-specific parameter configured (or reconfigured) using a medium access control (MAC) control element (CE) message.

Figure 3A:
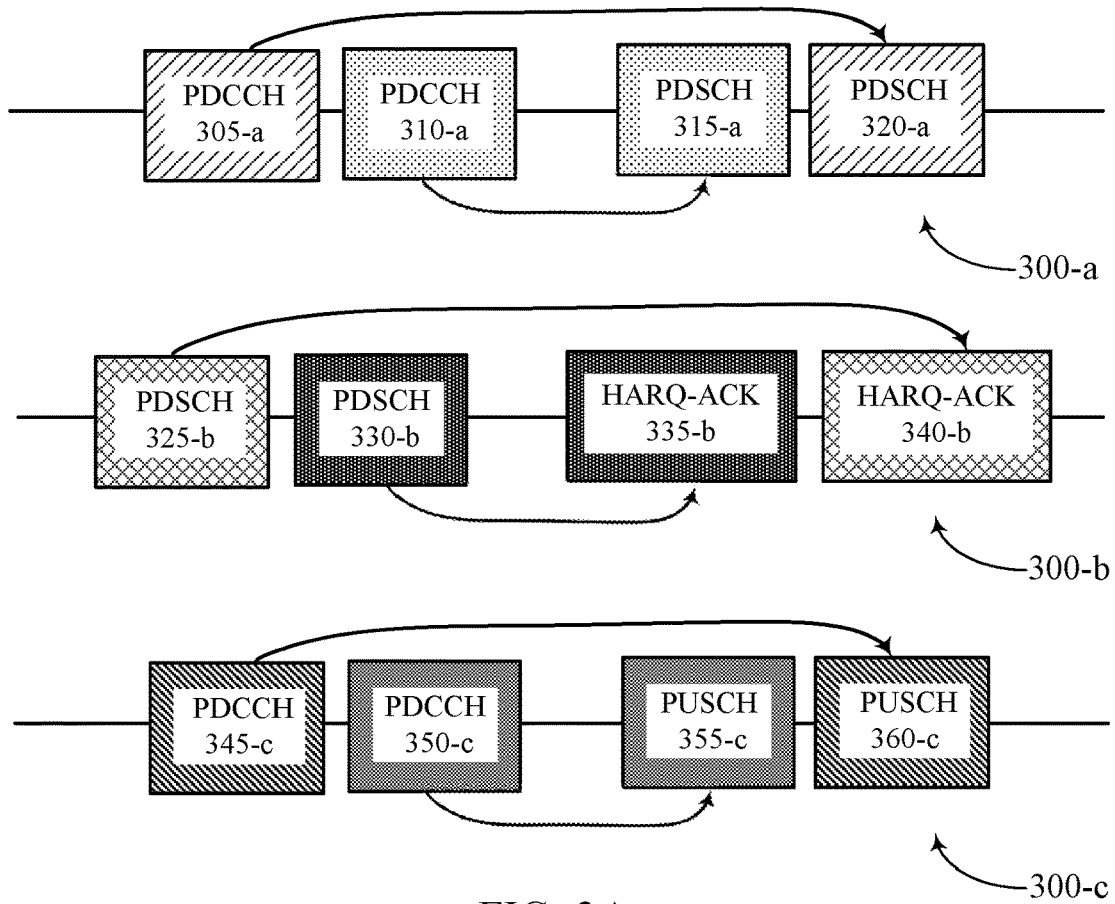
FIGS. 3A and 3B illustrate examples of communications schedules that support cell-based transmission priority in accordance with aspects of the present disclosure.

FIG. 3A illustrates examples of communications schedules 300 that support cell-based transmission priority in accordance with aspects of the present disclosure. In some examples, communications schedules 300 may implement aspects of wireless communications system 100. The following examples may take place at a UE (e.g., UE 115 as described herein), however it is to be understood that the described processes may take place at any wireless device.

In the example of communications schedule 300-a, a UE may receive a PDCCH transmission 305-a at a first time, and may receive a PDCCH transmission 310-a at a second, later, time. PDCCH 305-a and PDCCH 310-a may be examples of scheduling PDCCH transmissions, and may include scheduling and control information (e.g., DCI) which may allocate resources for scheduled transmissions. Information in PDCCH 305-a may schedule PDSCH transmission 320-a, and information in PDCCH 310-a may schedule PDSCH transmission 315-a. In some cases, the UE may determine the priority of a cell associated with PDSCH 315-a is greater than the priority of a cell associated with PDSCH 320-a, and may be enabled to receive PDSCH 315-a before PDSCH 320-a based on the determined priority.

In the example of communications schedule 300-b, a UE may receive a PDSCH transmission 325-b at a first time, and may receive a PDSCH transmission 330-b at a second, later time. PDSCH 325-b and PDSCH 330-b may be scheduled by a PDCCH, and may include user data. In some cases, the UE may be scheduled to transmit HARQ-ACK in response to PDSCH 325-b and PDSCH 330-b. The UE may then determine the priority of a cell associated with HARQ-ACK 335-b is greater than the priority of a cell associated with HARQ-ACK 340-b, and may transmit HARQ-ACK 335-b before HARQ-ACK 340-b based on the determined priority. In some cases, the transmission of HARQ-ACK 335-b before HARQ-ACK 340-b may be performed regardless of when respective PDCCHs carrying DCI scheduling PDSCH 325-b and 330-b are received.

In the example of communications schedule 300-c, a UE may receive a PDCCH transmission 345-c at a first time, and may receive a PDCCH transmission 350-c at a second, later time. PDCCH 345-c and PDCCH 350-c may be examples of scheduling PDCCH transmissions, and may include scheduling and control information (e.g., DCI) which may allocate resources for scheduled transmissions. Information in PDCCH 345-c may schedule PUSCH transmission 360-c, and information in PDCCH 350-c may schedule PDSCH transmission 355-c. In some cases, the UE may determine the priority of a cell associated with PUSCH 355-c is greater than the priority of a cell associated with PUSCH 360-c, and may transmit PUSCH 355-c before PUSCH 360-c based on the determined priority. In some cases, PUSCH 355-c may be a high priority transmission associated with URLLC communications, and PUSCH 360-c may be a low priority transmission associated with eMBB communications.

Figure 3B:
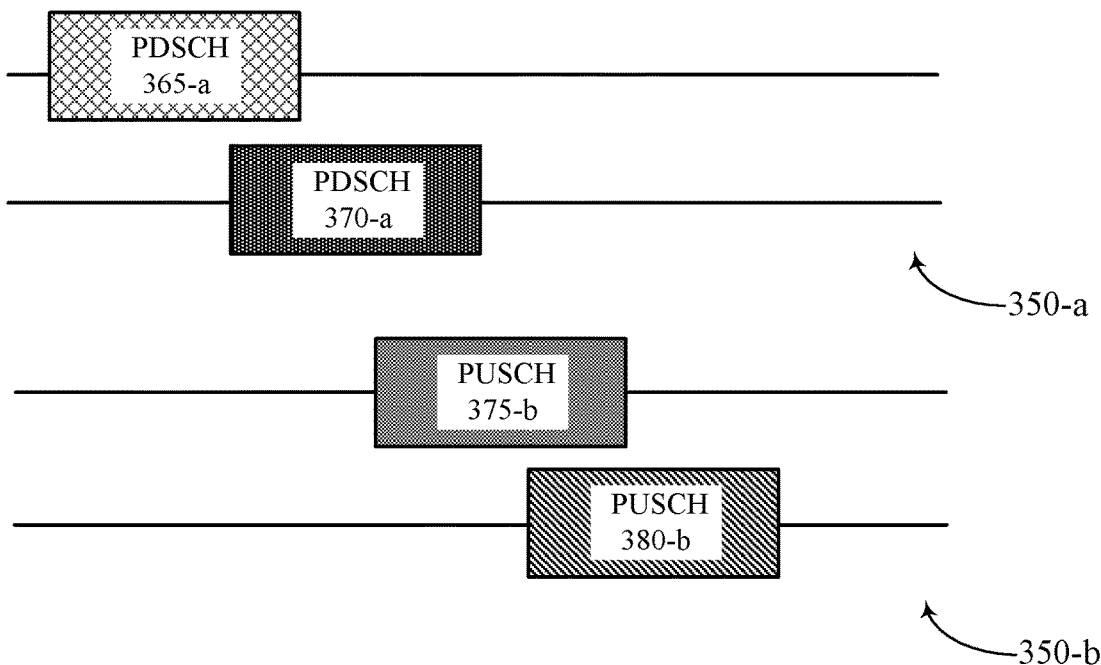

FIG. 3B illustrates example of various communications schedules 350 that support cell-based transmission priority in accordance with aspects of the present disclosure. In some examples, communications schedules 350 may implement aspects of wireless communications system 100. The following examples may take place at a UE (e.g., UE 115 as described herein), however it is to be understood that the described processes may take place at any wireless device.

In the example of communications schedule 350-a, a UE may receive a first scheduled PDSCH 365-a at a first time. The UE may then determine the priority of a cell associated with a second scheduled PDSCH 370-a is greater than the priority of the cell associated with the first scheduled PDSCH transmission 365-a. As a result, the UE may receive PDSCH 370-a during a time overlapping with the scheduled first time of PDSCH 365-a based on the determined priority. For example, the UE may interrupt PDSCH 365-b with PDSCH 370-*b*. In other cases, the UE may puncture PDSCH 365-*b* with PDSCH 370-*b*, or may preempt PDSCH 365-*b* in favor of PDSCH 370-*b*.

In the example of communications schedule 350-*b*, a UE may transmit a first PUSCH 375-*b* at a first scheduled time. The UE may then determine the priority of a cell associated with a second PUSCH 380-*b* is greater than the priority of the cell associated with the first scheduled PDSCH transmission 375-*b*. As a result, the UE may transmit PUSCH 380-*b* during a time overlapping with the scheduled first time of PDSCH 375-*b* based on the determined priority. For instance, the UE may interrupt PUSCH 375-*b* in favor of PUSCH 380-*b*. In other cases, the UE may puncture PUSCH 375-*b* with PUSCH 380-*b*, or may preempt PUSCH 375-*b* in favor of PUSCH 380-*b*.

Figure 4:
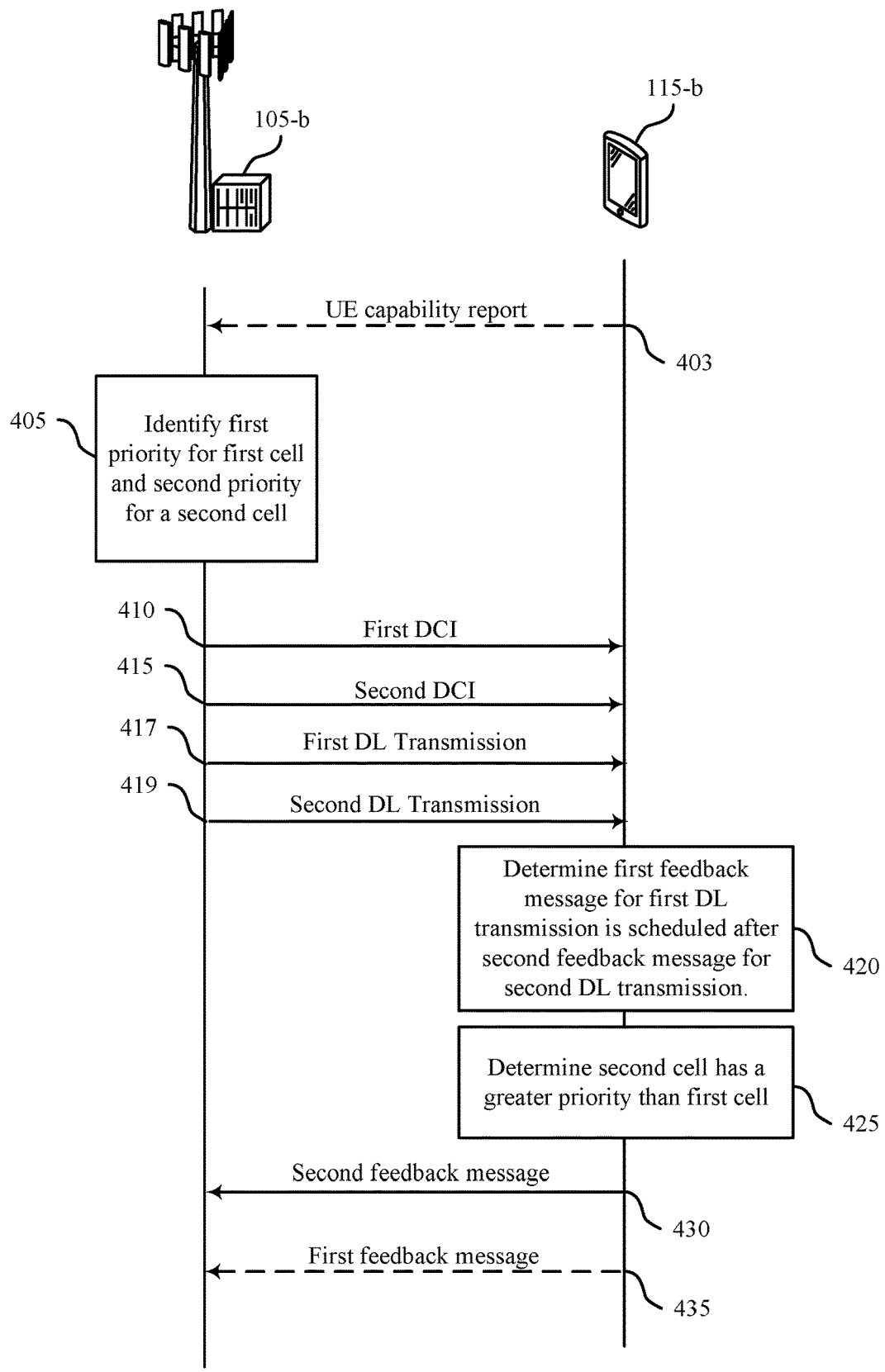
FIG. 4 illustrates an example of a process flow that supports cell-based transmission priority in accordance with aspects of the present disclosure.

FIG. 4 illustrates an example of a process flow 400 that supports cell-based transmission priority in accordance with aspects of the present disclosure. In some examples, process flow 400 may implement aspects of wireless communications system 100. For example, process flow 400 may include UE 115-*b* and base station 105-*b*, which may be respective examples of UE 115 and base station 105 as described herein.

At 403, UE 115-*b* may optionally transmit, and base station 105-*b* may receive, a UE capability report. For instance, the UE capability report may include information regarding a number of cells having respective priorities that UE 115-*b* supports. In such cases, UE 115-*b* may report that it supports a quantity of high-priority cells, a quantity of low-priority cells, or a combination thereof.

At 405, base station 105-*b* may identify a first priority for a first cell and a second priority for a second cell. In one example, base station 105-*b* may determine that the second priority associated with the second cell is greater than the first priority associated with the first cell. Base station 105-*b* may determine the priorities of the first and second cells using a number of techniques. For example, base station 105-*b* may determine the second cell has a greater priority based on a PDCCH received on the second cell.

At 410, base station 105-*b* may transmit, and UE 115-*b* may receive, a first DCI scheduling a first downlink transmission. In some cases, the first DCI may be transmitted on a PDCCH on the first cell. In some cases, base station 105-*b* may transmit the DCI based on the UE capability report (e.g., at 403).

At 415, base station 105-*b* may transmit, and UE 115-*b* may receive, a second DCI scheduling a second downlink transmission. In some cases, the second DCI may be transmitted on a PDCCH on the second cell. In some examples, UE 115-*b* may receive the second DCI scheduling transmission after receiving the first DCI. At 417 and 419, base station 105-*b* may transmit a first and second downlink transmission based on the first and second DCI, respectively. In some cases, the first and second downlink transmissions may include PDSCH transmissions.

At 420, UE 115-*b* may identify that a first feedback message responsive to the first scheduled downlink transmission is scheduled to occur no earlier than a second feedback message responsive to the second scheduled downlink transmission, where the first feedback message may be associated with the first cell, and the second feedback message may be associated with the second cell. In some examples, the first feedback message and the second feedback messages may be HARQ-ACK messages.

At 425, UE 115-*b* may determine that the second cell has a second priority that is greater than the first priority of the first cell. The UE 115-*b* may determine the priority based on the first feedback message being scheduled to occur no earlier than the second feedback message. In some cases, the second feedback message is prioritized over the first feedback message based on the second downlink control information and the second downlink transmission being on the same cell.

At 430, UE 115-*b* may transmit the second feedback message based on determining that the second cell has the second priority. At 435, UE 115-*b* may transmit the first scheduled uplink transmission based on having transmitted the second feedback message (e.g., the second feedback message is prioritized over the first feedback message).

Figure 5:
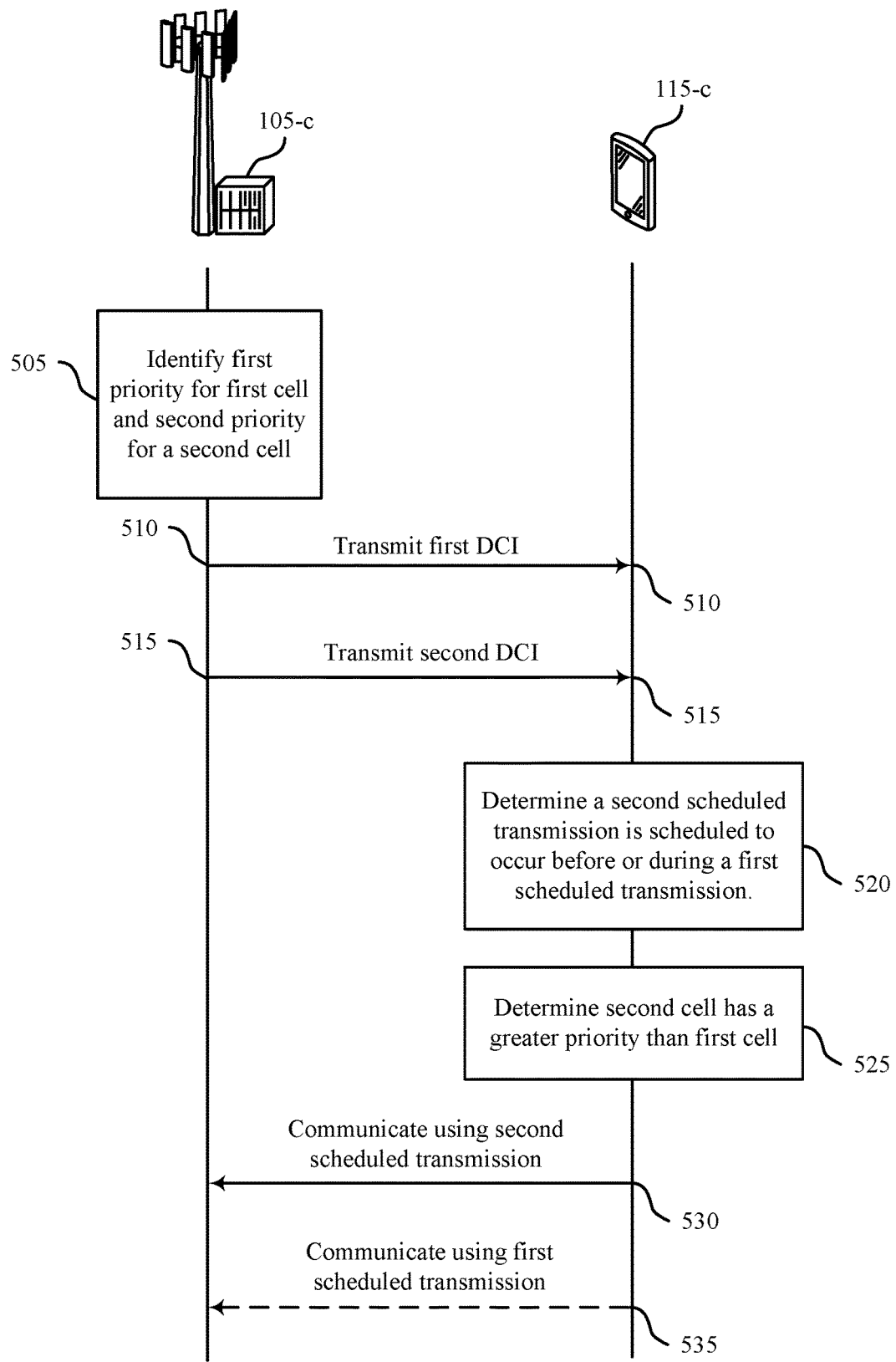
FIG. 5 illustrates an example of a process flow that supports cell-based transmission priority in accordance with aspects of the present disclosure.

FIG. 5 illustrates an example of a process flow 500 that supports cell-based transmission priority in accordance with aspects of the present disclosure. In some examples, process flow 500 may implement aspects of wireless communications system 100. For example, process flow 500 may include UE 115-*c* and base station 105-*c*, which may be respective examples of UE 115 and base station 105 as described herein.

At 505, base station 105-*c* may identify a first priority for a first cell and a second priority for a second cell. In one example, base station 105-*c* may determine that the second priority associated with the second cell is greater than the first priority associated with the first cell. Base station 105-*c* may determine the priorities of the first and second cells using a number of techniques. For example, the base station may determine that the first cell is associated with eMBB communications (e.g., lower priority traffic), and may further determine that the second cell is associated with URLLC communications (e.g., high priority traffic).

At 510, base station 105-*c* may transmit, and UE 115-*c* may receive, a first DCI scheduling a first downlink transmission. In some cases, the first DCI may be transmitted on a PDCCH on the first cell.

At 515, base station 105-*c* may transmit, and UE 115-*c* may receive, a second DCI scheduling a second downlink transmission. In some cases, the second DCI may be transmitted on a PDCCH on the second cell. In some examples, UE 115-*c* may receive the second DCI scheduling transmission after receiving the first DCI. In addition, the second downlink transmission may be scheduled to start no earlier than the first downlink transmission.

At 520, UE 115-*c* may determine that the second scheduled transmission is scheduled to occur before or during the first scheduled transmission. In some cases, the second scheduled transmission may be scheduled to occur during a time that overlaps with the time scheduled for the first scheduled transmission.

At 525, UE 115-*c* may determine that the second cell has a second priority that is greater than a first priority of the first cell based at least in part on the second scheduled transmission being scheduled to start before or during the first scheduled transmission. In some cases, UE 115-*c* may determine that the second scheduled transmission is prioritized over the first scheduled transmission based on the second scheduled transmission being scheduled on a same cell that the second downlink control information is received on. In other cases, UE 115-*c* may determine that the second cell has a higher priority based on an ability of the second cell to allocate resources for the second scheduled transmission.

At 530, UE 115-*c* may communicate using the second scheduled transmission based on determining that the second cell has the second priority, and that the second scheduled transmission is prioritized over the first scheduled transmission based on the second priority. At 535, UE 115-*c* may communicate using the first scheduled transmission based on having transmitted the second scheduled transmission (e.g., the second scheduled transmission is prioritized over the first scheduled transmission).

Figure 6:
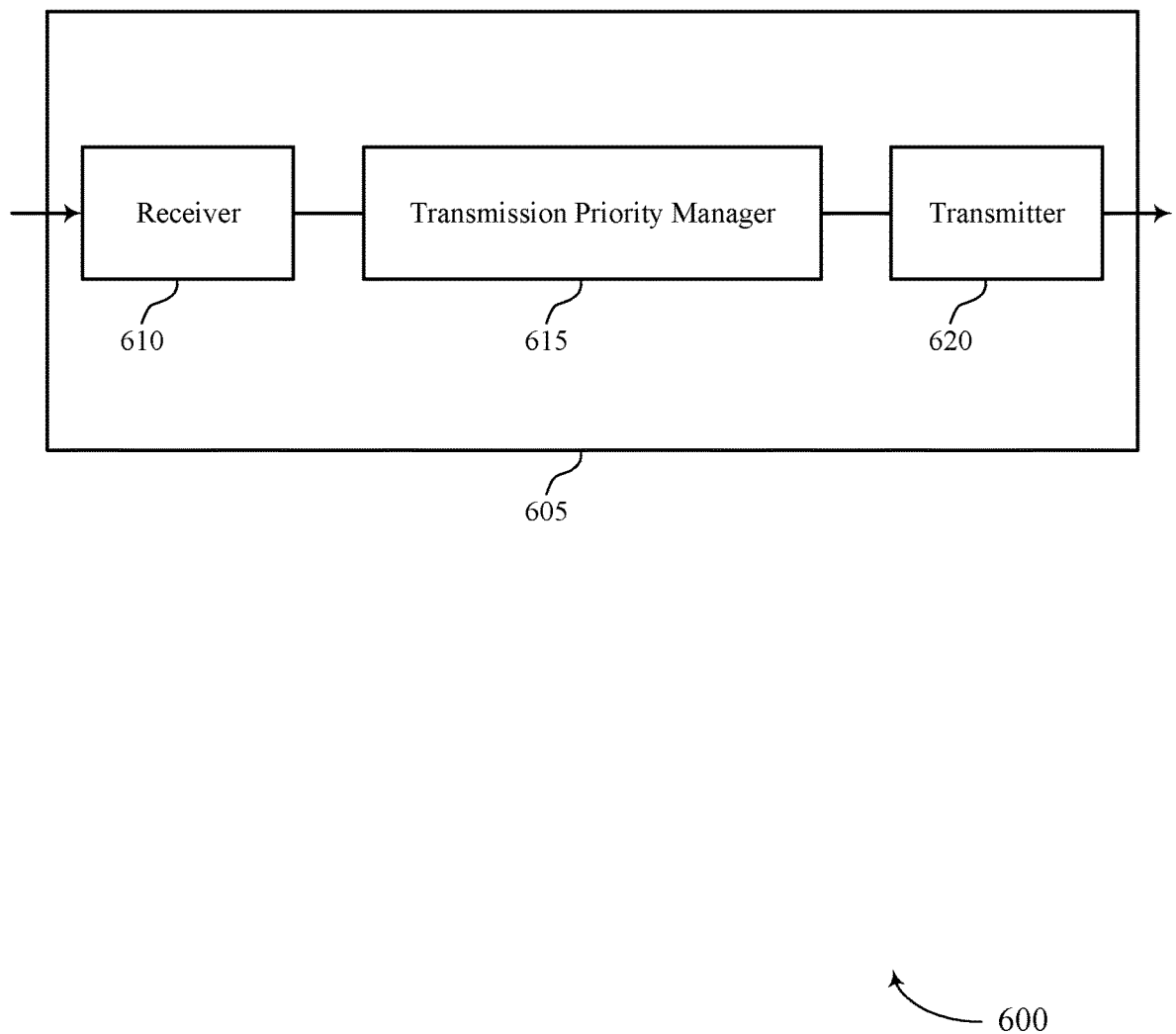
FIGS. 6 and 7 show block diagrams of devices that support cell-based transmission priority in accordance with aspects of the present disclosure.

FIG. 6 shows a block diagram 600 of a device 605 that supports cell-based transmission priority in accordance with aspects of the present disclosure. The device 605 may be an example of aspects of a UE 115 as described herein. The device 605 may include a receiver 610, a transmission priority manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cell-based transmission priority, etc.). Information may be passed on to other components of the device 605. The receiver 610 may be an example of aspects of the transceiver 1020 described with reference to FIG. 10. The receiver 610 may utilize a single antenna or a set of antennas.

The transmission priority manager 615 may receive a first downlink control information scheduling a first downlink transmission, receive a second downlink control information scheduling a second downlink transmission, where the second downlink transmission is scheduled to occur after the first downlink transmission, determine that a first feedback message responsive to the first downlink transmission is scheduled to occur no earlier than a second feedback message responsive to the second downlink transmission, the first feedback message being associated with a first cell and the second feedback message being associated with a second cell, determine, based on the first feedback message being scheduled to occur no earlier than the second feedback message, that the second cell has a second priority that is greater than a first priority of the first cell, and transmit the second feedback message based on determining that the second cell has the second priority, where the second feedback message is prioritized over the first feedback message based on the second priority.

The transmission priority manager 615 may also receive a first downlink control information scheduling a first transmission associated with a first cell, receive, after the first downlink control information, a second downlink control information scheduling a second transmission associated with a second cell, where the second scheduled transmission is scheduled to start before or during the first scheduled transmission, determine, based on the second scheduled transmission being scheduled to start before or during the first scheduled transmission, that the second cell has a second priority that is greater than a first priority of the first cell, and communicate using the second scheduled transmission based on determining that the second cell has the second priority, where the second scheduled transmission is prioritized over the first scheduled transmission based on the second priority. The transmission priority manager 615 may be an example of aspects of the transmission priority manager 1010 described herein.

The transmission priority manager 615, or its sub-components, may be implemented in hardware, code (e.g., software or firmware) executed by a processor, or any combination thereof. If implemented in code executed by a processor, the functions of the transmission priority manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The transmission priority manager 615, or its sub-components, may be physically located at various positions, including being distributed such that portions of functions are implemented at different physical locations by one or more physical components. In some examples, the transmission priority manager 615, or its sub-components, may be a separate and distinct component in accordance with various aspects of the present disclosure. In some examples, the transmission priority manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 1020 described with reference to FIG. 10. The transmitter 620 may utilize a single antenna or a set of antennas.

Figure 7:
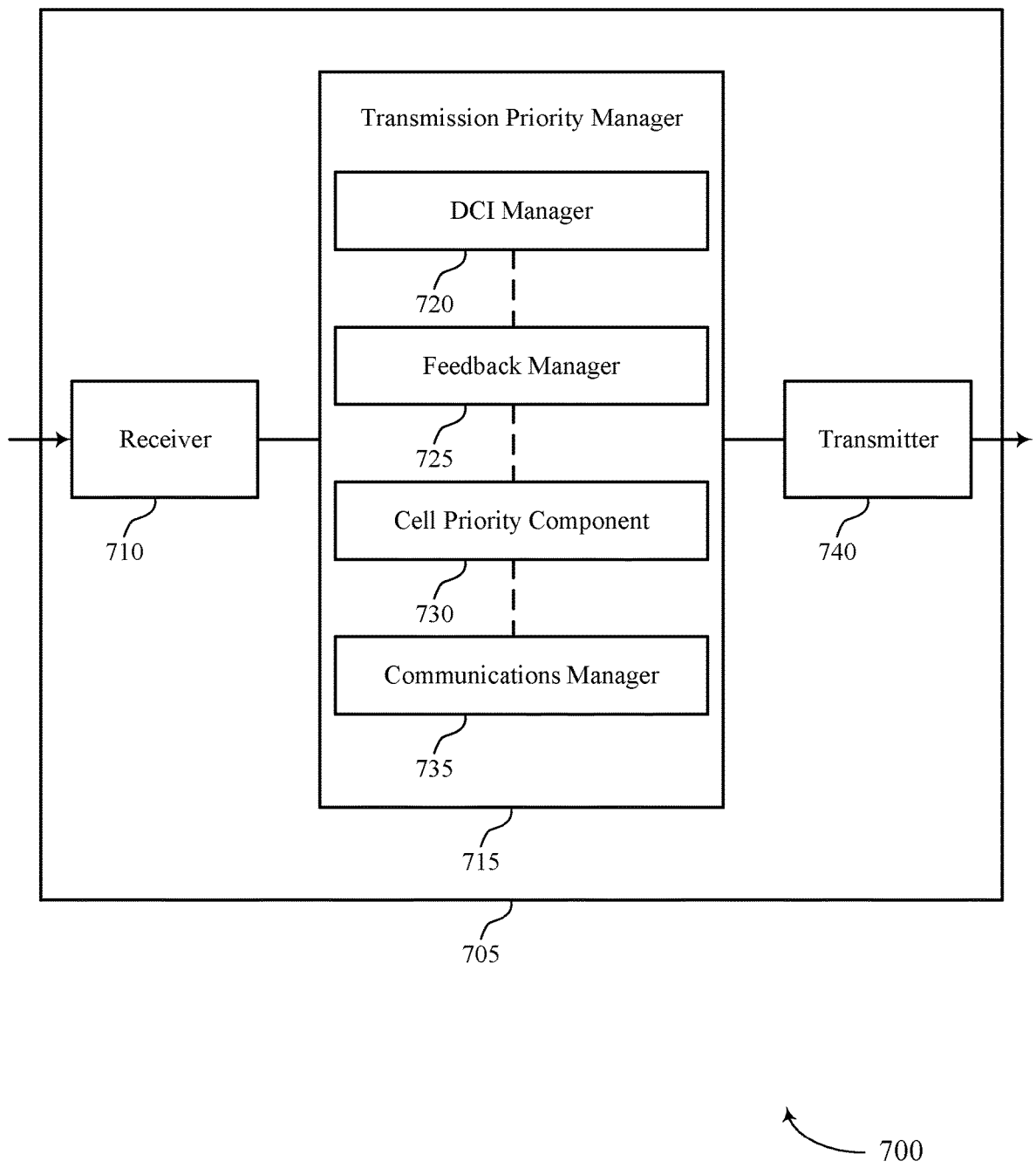

FIG. 7 shows a block diagram 700 of a device 705 that supports cell-based transmission priority in accordance with aspects of the present disclosure. The device 705 may be an example of aspects of a device 605, or a UE 115 as described herein. The device 705 may include a receiver 710, a transmission priority manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to cell-based transmission priority, etc.). Information may be passed on to other components of the device 705. The receiver 710 may be an example of aspects of the transceiver 1020 described with reference to FIG. 10. The receiver 710 may utilize a single antenna or a set of antennas.

The transmission priority manager 715 may be an example of aspects of the transmission priority manager 615 as described herein. The transmission priority manager 715 may include a DCI manager 720, a feedback manager 725, a cell priority component 730, and a communications manager 735. The transmission priority manager 715 may be an example of aspects of the transmission priority manager 1010 described herein.

The actions performed by the transmission priority manager 715 as described herein may be implemented to realize one or more potential advantages. One implementation may allow a UE 115 to improve overall user experience by decreasing latency of high priority transmissions, such that high priority data may be sent (or received) before or during subsequent transmission of low priority data. Accordingly, the reliability of transmissions in accordance with a particular service may be improved.

The DCI manager 720 may receive a first downlink control information scheduling a first downlink transmission and receive a second downlink control information scheduling a second downlink transmission, where the second downlink transmission is scheduled to occur after the first downlink transmission.

The feedback manager 725 may determine that a first feedback message responsive to the first downlink transmission is scheduled to occur no earlier than a second feedback message responsive to the second downlink transmission, the first feedback message being associated with a first cell and the second feedback message being associated with a second cell.

The cell priority component 730 may determine, based on the first feedback message being scheduled to occur no earlier than the second feedback message, that the second cell has a second priority that is greater than a first priority of the first cell.

The communications manager 735 may transmit the second feedback message based on determining that the second cell has the second priority, where the second feedback message is prioritized over the first feedback message based on the second priority.

The DCI manager 720 may receive a first downlink control information scheduling a first transmission associated with a first cell and receive, after the first downlink control information, a second downlink control information scheduling a second transmission associated with a second cell, where the second scheduled transmission is scheduled to start before or during the first scheduled transmission.

The cell priority component 730 may determine, based on the second scheduled transmission being scheduled to start before or during the first scheduled transmission, that the second cell has a second priority that is greater than a first priority of the first cell.

The communications manager 735 may communicate using the second scheduled transmission based on determining that the second cell has the second priority, where the second scheduled transmission is prioritized over the first scheduled transmission based on the second priority.

The transmitter 740 may transmit signals generated by other components of the device 705. In some examples, the transmitter 740 may be collocated with a receiver 710 in a transceiver module. For example, the transmitter 740 may be an example of aspects of the transceiver 1020 described with reference to FIG. 10. The transmitter 740 may utilize a single antenna or a set of antennas.

Figure 8:
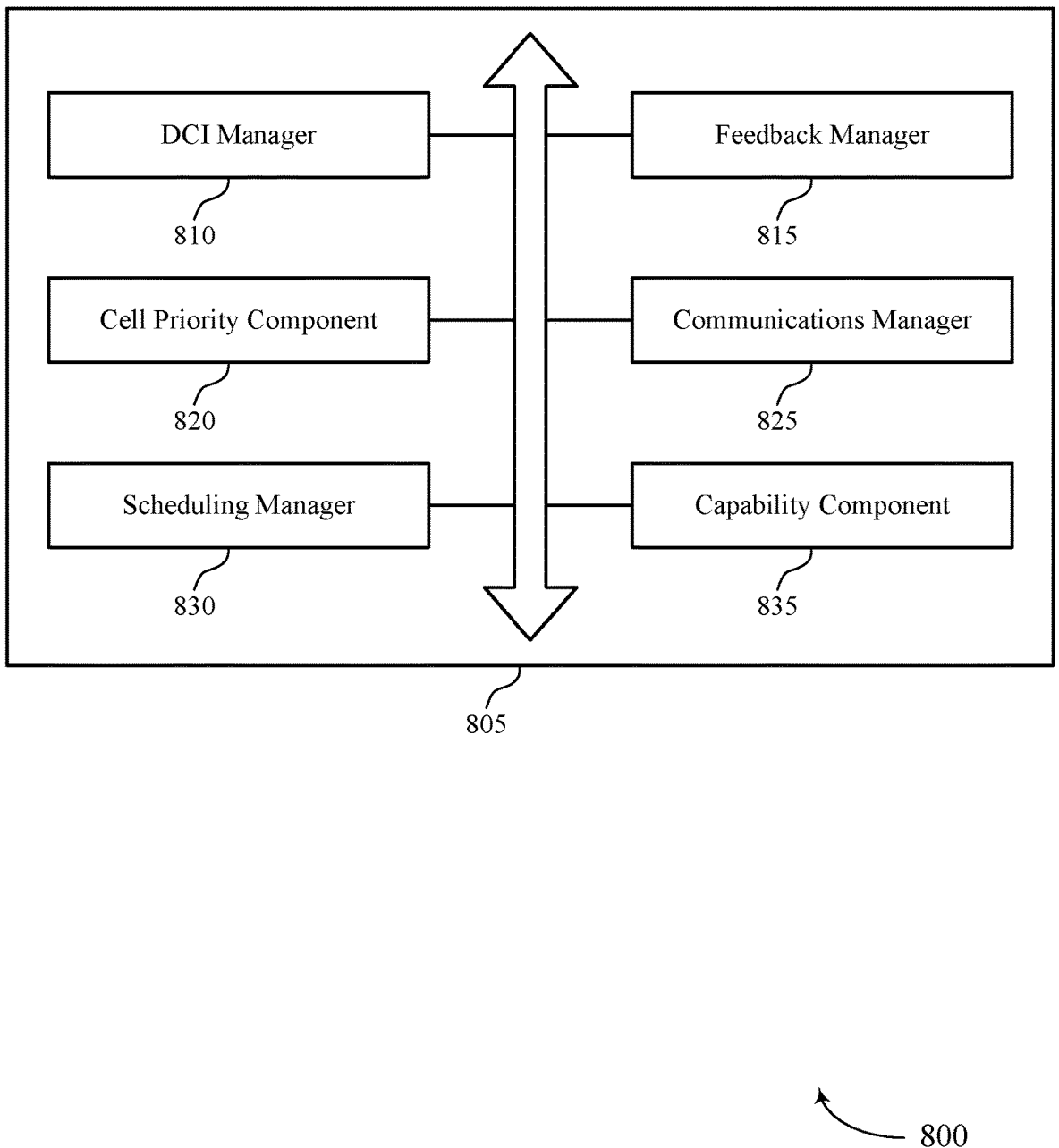
FIG. 8 shows a block diagram of a transmission priority manager that supports cell-based transmission priority in accordance with aspects of the present disclosure.

FIG. 8 shows a block diagram 800 of a transmission priority manager 805 that supports cell-based transmission priority in accordance with aspects of the present disclosure. The transmission priority manager 805 may be an example of aspects of a transmission priority manager 615, a transmission priority manager 715, or a transmission priority manager 1010 described herein. The transmission priority manager 805 may include a DCI manager 810, a feedback manager 815, a cell priority component 820, a communications manager 825, a scheduling manager 830, and a capability component 835. Each of these modules may communicate, directly or indirectly, with one another (e.g., via one or more buses).

The DCI manager 810 may receive a first downlink control information scheduling a first downlink transmission.

In some examples, the DCI manager 810 may receive a second downlink control information scheduling a second downlink transmission, where the second downlink transmission is scheduled to occur after the first downlink transmission.

In some examples, the DCI manager 810 may receive a first downlink control information scheduling a first transmission associated with a first cell.

In some examples, the DCI manager 810 may receive, after the first downlink control information, a second downlink control information scheduling a second transmission associated with a second cell, where the second scheduled transmission is scheduled to start before or during the first scheduled transmission.

In some examples, the DCI manager 810 may receive the second downlink control information via a physical downlink control channel on the second cell.

In some examples, the DCI manager 810 may receive, as part of the second downlink control information, an indication that the second cell has the second priority.

In some examples, the DCI manager 810 may determine that the second downlink control information was received on the second cell based on a cell identifier, a scrambling sequence, a control resource set, a search space, or a combination thereof, where at least one of the cell identifier, the control resource set, or the search space corresponds to the second cell.

In some examples, the DCI manager 810 may receive the second downlink control information via a physical downlink control channel on the second cell.

In some examples, the DCI manager 810 may determine that the second downlink control information was received on the second cell based on a cell identifier, a scrambling sequence, a control resource set, a search space, or a combination thereof, where at least one of the cell identifier, the control resource set, or the search space corresponds to the second cell.

In some cases, the second downlink control information includes a format that excludes a carrier indicator.

In some cases, the first cell and the second cell include respective virtual cells that are associated with a same physical cell.

The feedback manager 815 may determine that a first feedback message responsive to the first downlink transmission is scheduled to occur no earlier than a second feedback message responsive to the second downlink transmission, the first feedback message being associated with a first cell and the second feedback message being associated with a second cell.

In some cases, the second feedback message is transmitted before the first feedback message, the second feedback message interrupts the first feedback message, the second feedback message preempts the first feedback message, the second feedback message punctures the first feedback message, or a combination thereof.

In some cases, the first feedback message includes a first hybrid automatic repeat request feedback for the first downlink transmission. In some cases, the second feedback message includes a second hybrid automatic repeat request feedback for the second downlink transmission. In some cases, the first feedback message is associated with a first service type. In some cases, the second feedback message is associated with a second service type that is associated with a reliability threshold and a latency threshold.

The cell priority component 820 may determine, based on the first feedback message being scheduled to occur no earlier than the second feedback message, that the second cell has a second priority that is greater than a first priority of the first cell.

In some examples, the cell priority component 820 may determine, based on the second scheduled transmission being scheduled to start before or during the first scheduled transmission, that the second cell has a second priority that is greater than a first priority of the first cell. In some examples, the cell priority component 820 may determine that the second cell has the second priority based on the physical downlink control channel being on the second cell.

In some examples, the cell priority component 820 may determine that the second cell has the second priority based on the second downlink transmission being scheduled on the second cell. In some examples, the cell priority component 820 may identify a first set of cells having the first priority and a second set of cells having the second priority. In some examples, the cell priority component 820 may receive, from a base station, an indication that the second cell has the second priority.

In some examples, the cell priority component 820 may receive downlink control information indicating a switch of a bandwidth part, where the second priority is modified based on the switch of the bandwidth part. In some examples, the cell priority component 820 may determine that the second cell has the second priority based on the physical downlink control channel being on the second cell.

In some examples, the cell priority component 820 may determine that the second cell has the second priority based on the second scheduled transmission being scheduled on the second cell. In some examples, the cell priority component 820 may receive, as part of the second downlink control information, an indication that the second cell has the second priority. In some examples, the cell priority component 820 may identify a first set of cells having the first priority and a second set of cells having the second priority.

In some examples, the cell priority component 820 may receive, from a base station, an indication that the second cell has the second priority. In some examples, the cell priority component 820 may receive downlink control information indicating a switch of a bandwidth part, where the second priority is modified based on the switch of the bandwidth part.

In some cases, the indication includes a cell-specific parameter that is modified via radio resource control signaling. In some cases, the indication includes a cell-specific parameter that is modified via medium access control (MAC) control element messaging. In some cases, the indication includes a bandwidth part-specific radio resource control parameter. In some cases, the first cell and the second cell include respective cells that are associated with a same physical cell.

In some cases, the first cell and the second cell include respective cells that are each associated with a different physical cell. In some cases, the second downlink control information includes a format that excludes a carrier indicator. In some cases, the indication includes a cell-specific parameter that is modified via radio resource control signaling.

In some cases, the indication includes a cell-specific parameter that is modified via medium access control (MAC) control element messaging. In some cases, the indication includes a bandwidth part-specific radio resource control parameter. In some cases, the first cell and the second cell include respective virtual cells that are each associated with a different physical cell.

The communications manager 825 may transmit the second feedback message based on determining that the second cell has the second priority, where the second feedback message is prioritized over the first feedback message based on the second priority.

In some examples, the communications manager 825 may communicate using the second scheduled transmission based on determining that the second cell has the second priority, where the second scheduled transmission is prioritized over the first scheduled transmission based on the second priority.

In some cases, the second scheduled transmission is communicated before the first scheduled transmission, the second scheduled transmission interrupts the first scheduled transmission, the second scheduled transmission preempts the first scheduled transmission, the second scheduled transmission punctures the first scheduled transmission, or a combination thereof In some cases, the first scheduled transmission includes a first physical downlink shared channel. In some cases, the second scheduled transmission includes a second physical downlink shared channel for a second downlink transmission. In some cases, the first scheduled transmission includes a first physical uplink shared channel. In some cases, the second scheduled transmission includes a second physical uplink shared channel. In some cases, the first scheduled transmission is associated with a first service type. In some cases, the second scheduled transmission is associated with a second service type that is associated with a reliability threshold and a latency threshold.

The scheduling manager 830 may identify the second cell as a scheduling cell based on a control resource set, a search space, a scrambling sequence, a cell-specific configuration for the second cell, or a combination thereof, where the second priority is based on the scheduling cell.

In some examples, the scheduling manager 830 may identify that the second downlink transmission is scheduled to occur on the second cell based on the second downlink control information.

In some examples, the scheduling manager 830 may identify that the second downlink transmission is scheduled to occur on the second cell based on the second downlink control information, where determining that the second cell has the second priority is based on the second downlink transmission being scheduled to occur on the second cell, or the physical downlink control channel being received on the second cell, or a combination thereof In some examples, the scheduling manager 830 may determine that the second downlink transmission is scheduled to occur on a same cell that the second downlink control information is received on, where the second feedback message is prioritized over the first feedback message based on the second downlink control information and the second downlink transmission being on the same cell.

In some examples, the scheduling manager 830 may identify the second cell as a cell allocating resources for the second scheduled transmission based on a control resource set, a search space, a scrambling sequence, a cell-specific configuration for the second cell, or a combination thereof, where the second priority is based on the cell allocating the resources.

In some examples, the scheduling manager 830 may identify that the second scheduled transmission is scheduled on the second cell based on the second downlink control information.

In some examples, the scheduling manager 830 may identify that the second scheduled transmission is scheduled on the second cell based on the second downlink control information, where determining that the second cell has the second priority is based on the second scheduled transmission being scheduled on the second cell, or the physical downlink control channel being received on the second cell, or a combination thereof.

In some examples, the scheduling manager 830 may determine that the second scheduled transmission is scheduled on a same cell that the second downlink control information is received on, where the second scheduled transmission is prioritized over the first scheduled transmission based on the second downlink control information and the second scheduled transmission being on the same cell.

The capability component 835 may determine a UE capability based on supporting at least a subset of the first set of cells, or a subset of the second set of cells, or a combination thereof.

In some examples, the capability component 835 may transmit, to a base station, a report indicating the determined UE capability.

In some examples, the capability component 835 may determine a UE capability based on supporting at least a subset of the first set of cells, or a subset of the second set of cells, or a combination thereof.

In some examples, the capability component 835 may transmit, to a base station, a report indicating the determined UE capability.

Figure 9:
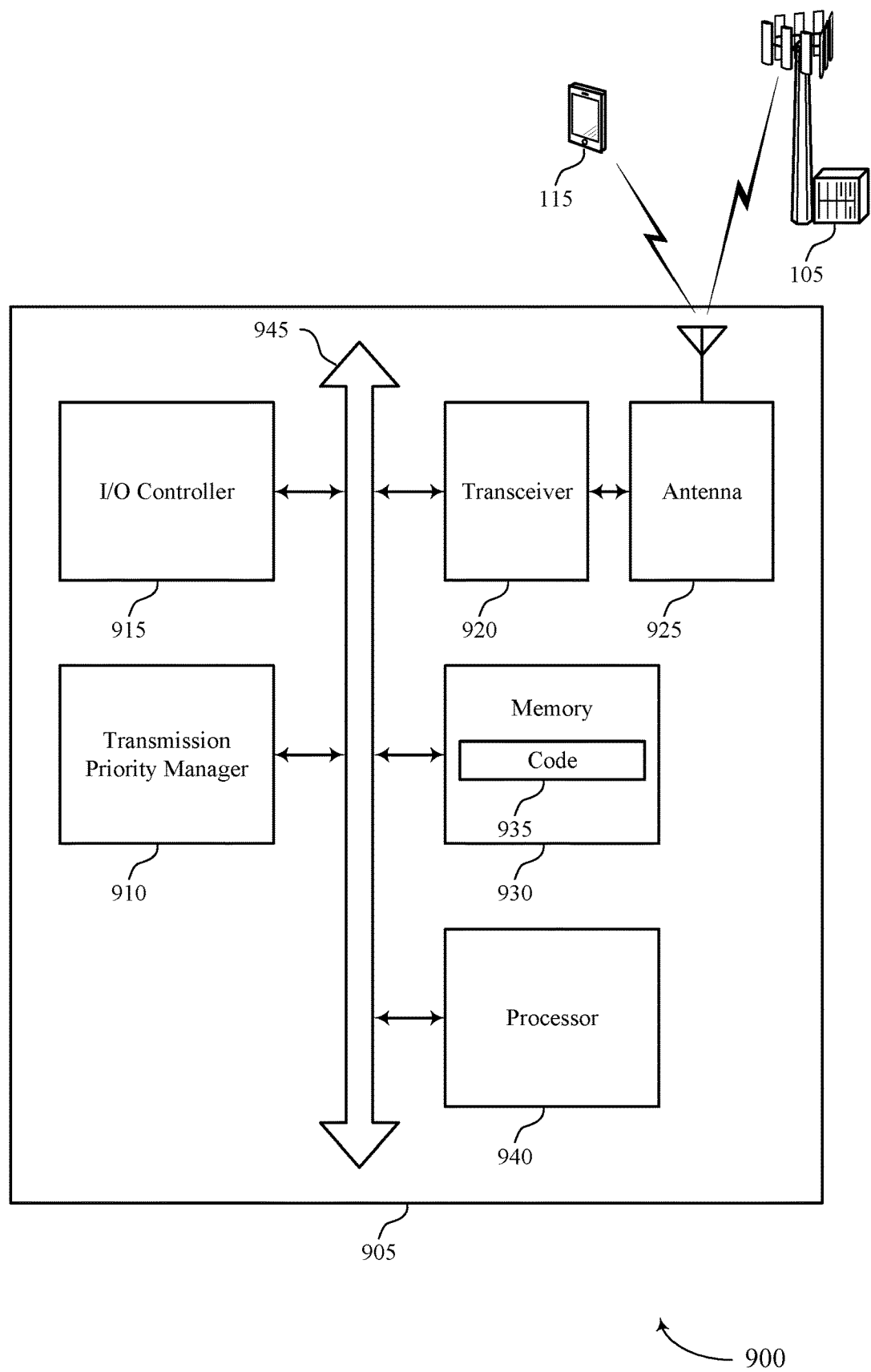
FIG. 9 shows a diagram of a system including a device that supports cell-based transmission priority in accordance with aspects of the present disclosure.

FIG. 9 shows a diagram of a system 900 including a device 905 that supports cell-based transmission priority in accordance with aspects of the present disclosure. The device 905 may be an example of or include the components of device 605, device 705, or a UE 115 as described herein. The device 905 may include components for bi-directional voice and data communications including components for transmitting and receiving communications, including a transmission priority manager 910, an I/O controller 915, a transceiver 920, an antenna 925, memory 930, and a processor 940. These components may be in electronic communication via one or more buses (e.g., bus 945).

The transmission priority manager 910 may receive a first downlink control information scheduling a first downlink transmission, receive a second downlink control information scheduling a second downlink transmission, where the second downlink transmission is scheduled to occur after the first downlink transmission, determine that a first feedback message responsive to the first downlink transmission is scheduled to occur no earlier than a second feedback message responsive to the second downlink transmission, the first feedback message being associated with a first cell and the second feedback message being associated with a second cell, determine, based on the first feedback message being scheduled to occur no earlier than the second feedback message, that the second cell has a second priority that is greater than a first priority of the first cell, and transmit the second feedback message based on determining that the second cell has the second priority, where the second feedback message is prioritized over the first feedback message based on the second priority. The transmission priority manager 910 may also receive a first downlink control information scheduling a first transmission associated with a first cell, receive, after the first downlink control information, a second downlink control information scheduling a second transmission associated with a second cell, where the second scheduled transmission is scheduled to start before or during the first scheduled transmission, determine, based on the second scheduled transmission being scheduled to start before or during the first scheduled transmission, that the second cell has a second priority that is greater than a first priority of the first cell, and communicate using the second scheduled transmission based on determining that the second cell has the second priority, where the second scheduled transmission is prioritized over the first scheduled transmission based on the second priority.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cell-based transmission priority). In some cases, the methods described herein may improve processing speeds at the processor. For example, a UE may avoid buffering high-priority data or may not need to wait for an ongoing transmission to complete in order to send the high priority data. Such techniques may therefore decrease latency and processing times.

Based on enabling more efficient scheduling of transmissions with less buffer time based on their associated priorities, processor 940 of a UE 115 may be ready to respond more efficiently through the reduction of a ramp up in processing power. As such, processor 940 may conserve power and further the battery life of a UE 115.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
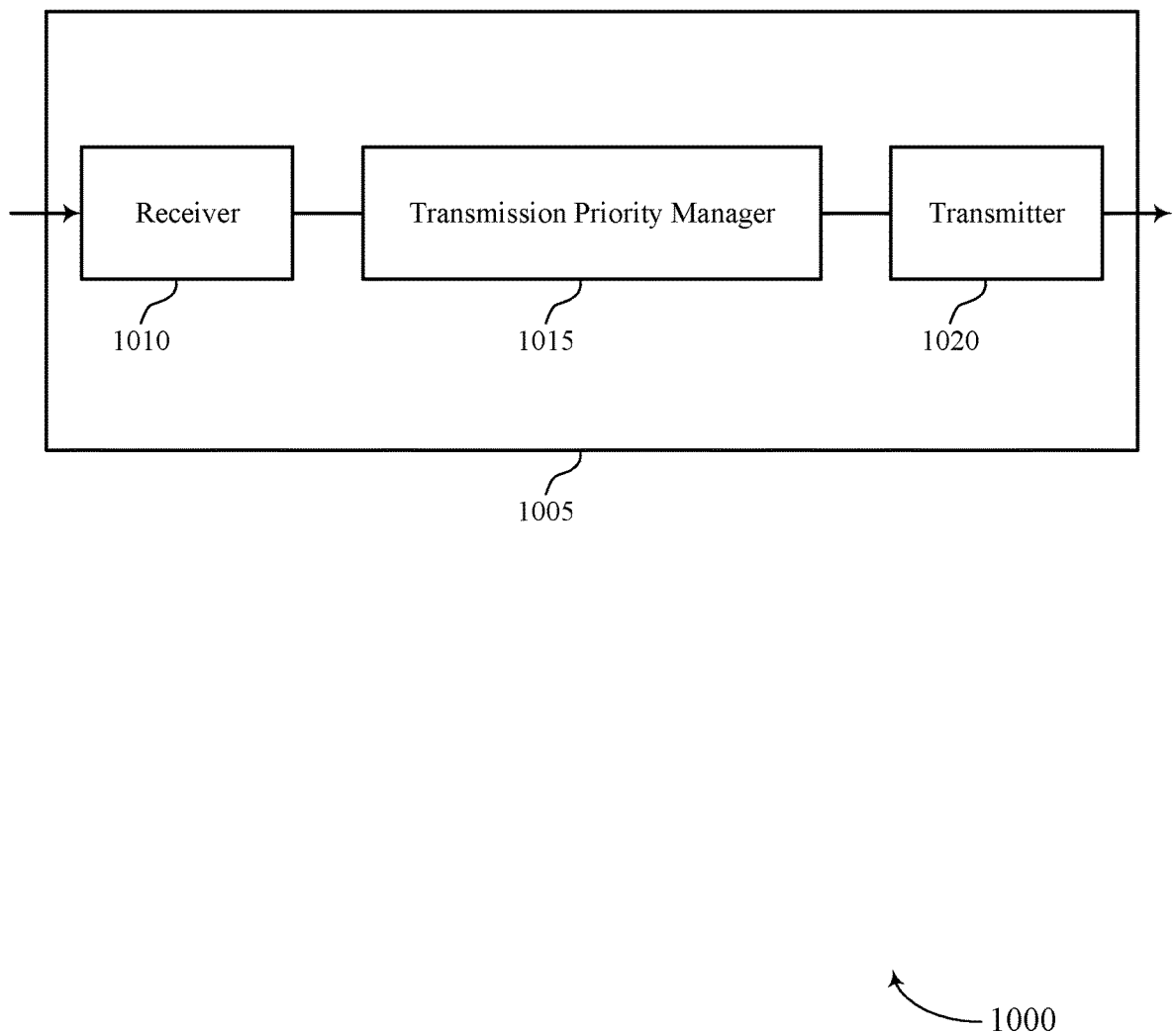
FIGS. 10 and 11 show block diagrams of devices that support cell-based transmission priority in accordance with aspects of the present disclosure.

FIG. 10 shows a block diagram 1000 of a device 1005 that supports cell-based transmission priority in accordance with aspects of the present disclosure. The device 1005 may be an example of aspects of a base station 105 as described herein. The device 1005 may include a receiver 1010, a transmission priority manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cell-based transmission priority, etc.). Information may be passed on to other components of the device 1005. The receiver 1010 may be an example of aspects of the transceiver 1420 described with reference to FIG. 14. The receiver 1010 may utilize a single antenna or a set of antennas.

The transmission priority manager 1015 may identify a first priority for a first cell and a second priority for a second cell, where the second priority is greater than the first priority, transmit, to a UE, a first downlink control information scheduling a first downlink transmission, transmit, to the UE, a second downlink control information scheduling a second downlink transmission, transmit the first scheduled downlink transmission before the second scheduled downlink transmission, and receive a second feedback message associated with the second cell, the second feedback message being prioritized over a first feedback message based on the second priority, where the first feedback message is responsive to the first scheduled downlink transmission and the second feedback message is responsive to the second scheduled downlink transmission. The transmission priority manager 1015 may also identify a first priority for a first cell and a second priority for a second cell, where the second priority is greater than the first priority, transmit a first downlink control information scheduling a first transmission associated with the first cell, transmit, after the first downlink control information, a second downlink control information scheduling a second transmission associated with the second cell, and communicate using the second scheduled transmission, where the second scheduled transmission is prioritized over the first scheduled transmission based on the second priority. The transmission priority manager 1015 may be an example of aspects of the transmission priority manager 1410 described herein.

The transmission priority manager 1015, or its sub-components, may be implemented in hardware, code (e.g., software or firmware) executed by a processor, or any combination thereof. If implemented in code executed by a processor, the functions of the transmission priority manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The transmission priority manager 1015, or its sub-components, may be physically located at various positions, including being distributed such that portions of functions are implemented at different physical locations by one or more physical components. In some examples, the transmission priority manager 1015, or its sub-components, may be a separate and distinct component in accordance with various aspects of the present disclosure. In some examples, the transmission priority manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1420 described with reference to FIG. 14. The transmitter 1020 may utilize a single antenna or a set of antennas.

Figure 11:
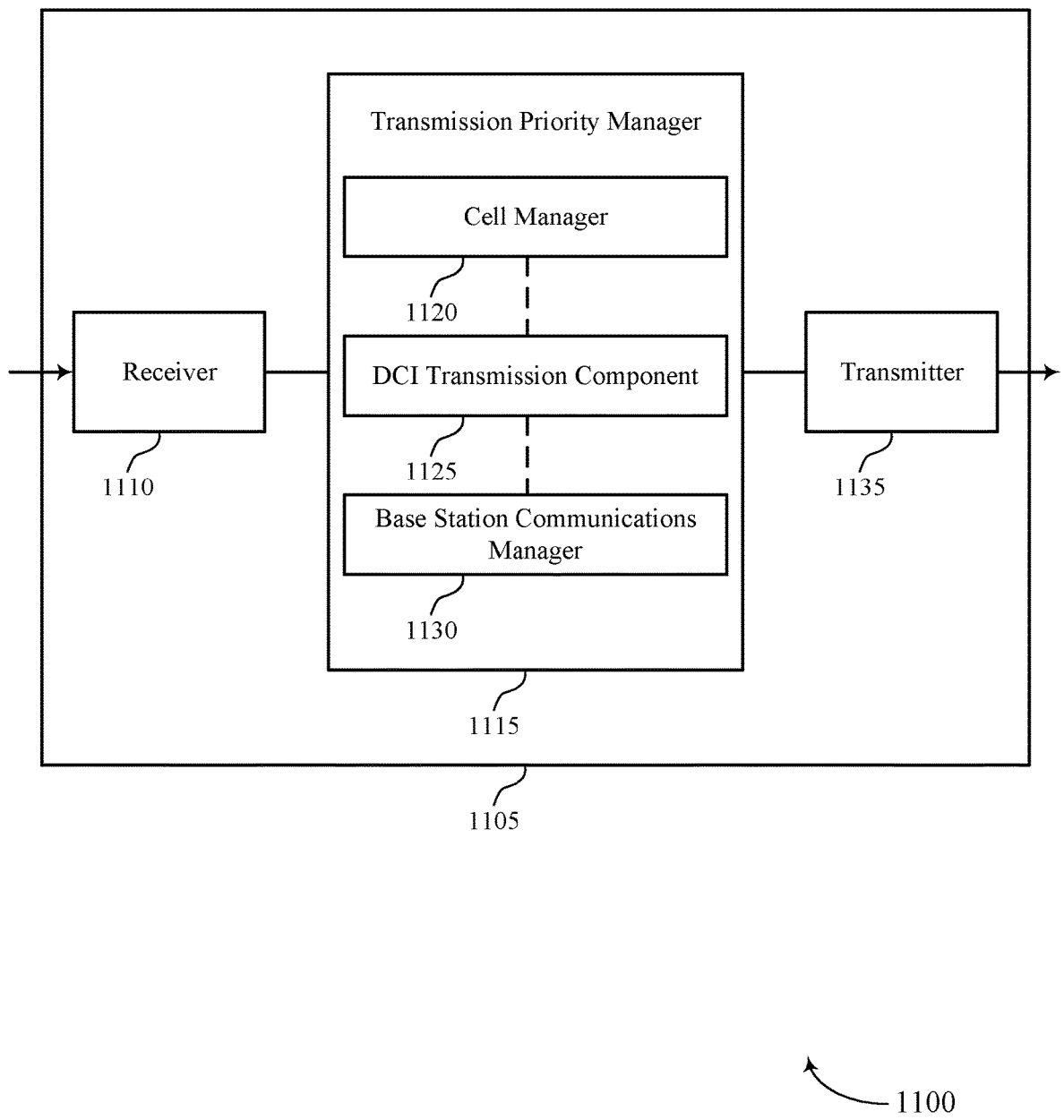

FIG. 11 shows a block diagram 1100 of a device 1105 that supports cell-based transmission priority in accordance with aspects of the present disclosure. The device 1105 may be an example of aspects of a device 1005, or a base station 105 as described herein. The device 1105 may include a receiver 1110, a transmission priority manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to cell-based transmission priority, etc.). Information may be passed on to other components of the device 1105. The receiver 1110 may be an example of aspects of the transceiver 1420 described with reference to FIG. 14. The receiver 1110 may utilize a single antenna or a set of antennas.

The transmission priority manager 1115 may be an example of aspects of the transmission priority manager 1015 as described herein. The transmission priority manager 1115 may include a cell manager 1120, a DCI transmission component 1125, and a base station communications manager 1130. The transmission priority manager 1115 may be an example of aspects of the transmission priority manager 1410 described herein.

The actions performed by the transmission priority manager 1115 as described herein may be implemented to realize one or more potential advantages. One implementation may allow a base station 105 to improve overall user experience by decreasing latency of high priority transmissions, such that high priority data may be sent (or received) before or during subsequent transmission of low priority data. Accordingly, the reliability of transmissions in accordance with a particular service may be improved.

The cell manager 1120 may identify a first priority for a first cell and a second priority for a second cell, where the second priority is greater than the first priority.

The DCI transmission component 1125 may transmit, to a UE, a first downlink control information scheduling a first downlink transmission and transmit, to the UE, a second downlink control information scheduling a second downlink transmission.

The base station communications manager 1130 may transmit the first scheduled downlink transmission before the second scheduled downlink transmission and receive a second feedback message associated with the second cell, the second feedback message being prioritized over a first feedback message based on the second priority, where the first feedback message is responsive to the first scheduled downlink transmission and the second feedback message is responsive to the second scheduled downlink transmission.

The cell manager 1120 may identify a first priority for a first cell and a second priority for a second cell, where the second priority is greater than the first priority.

The DCI transmission component 1125 may transmit a first downlink control information scheduling a first transmission associated with the first cell.

The base station communications manager 1130 may transmit, after the first downlink control information, a second downlink control information scheduling a second transmission associated with the second cell and communicate using the second scheduled transmission, where the second scheduled transmission is prioritized over the first scheduled transmission based on the second priority.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1420 described with reference to FIG. 14. The transmitter 1135 may utilize a single antenna or a set of antennas.

Figure 12:
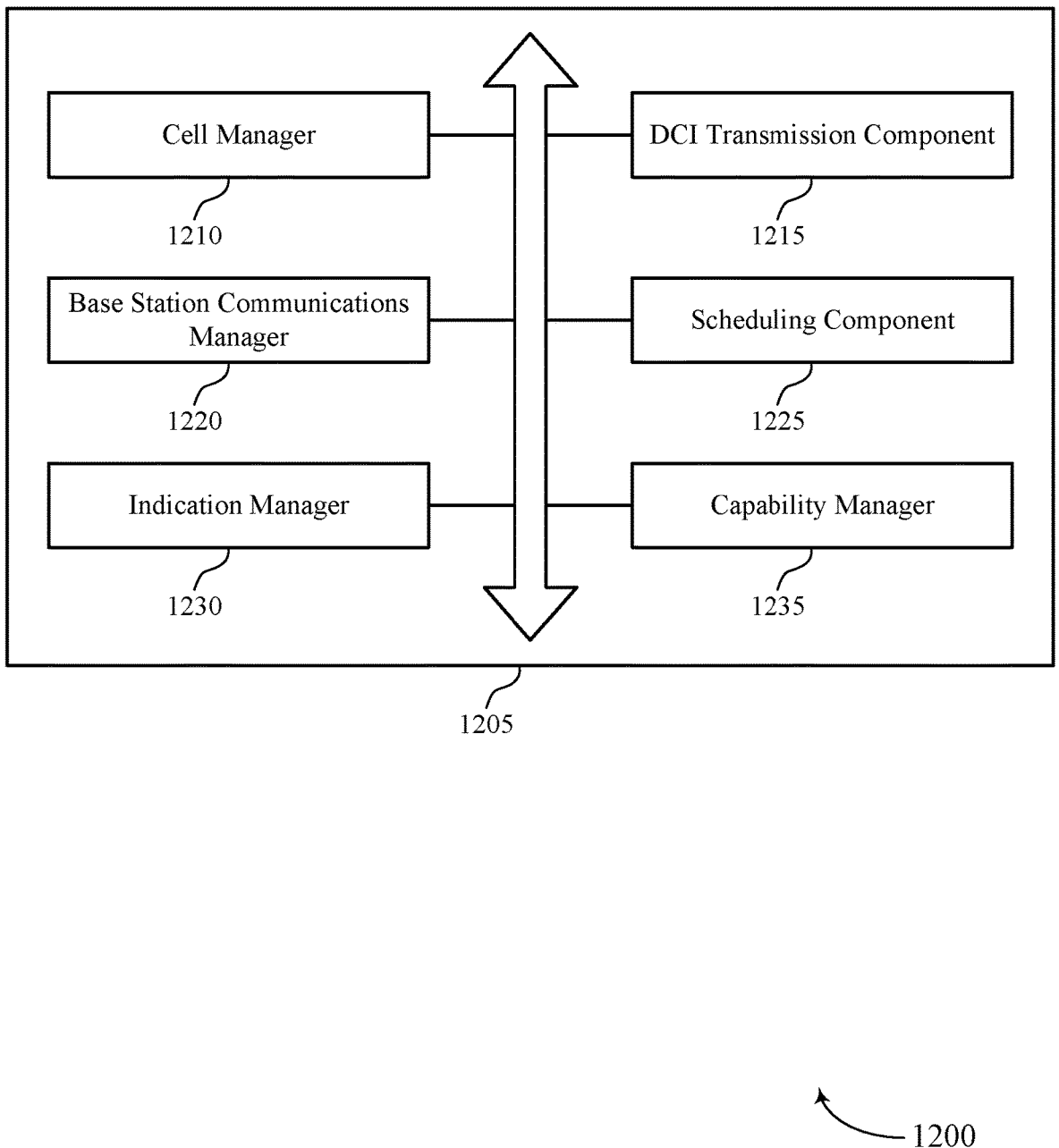
FIG. 12 shows a block diagram of a transmission priority manager that supports cell-based transmission priority in accordance with aspects of the present disclosure.

FIG. 12 shows a block diagram 1200 of a transmission priority manager 1205 that supports cell-based transmission priority in accordance with aspects of the present disclosure. The transmission priority manager 1205 may be an example of aspects of a transmission priority manager 1015, a transmission priority manager 1115, or a transmission priority manager 1410 described herein. The transmission priority manager 1205 may include a cell manager 1210, a DCI transmission component 1215, a base station communications manager 1220, a scheduling component 1225, an indication manager 1230, and a capability manager 1235. Each of these modules may communicate, directly or indirectly, with one another (e.g., via one or more buses).

The cell manager 1210 may identify a first priority for a first cell and a second priority for a second cell, where the second priority is greater than the first priority. In some examples, the cell manager 1210 may identify a first priority for a first cell and a second priority for a second cell, where the second priority is greater than the first priority.

In some examples, configuring the second cell as a cell allocating resources for the second scheduled downlink transmission, where the configuration includes a control resource set, a search space, a scrambling sequence, a cell-specific configuration for the second cell, or a combination thereof, where the second priority is based on the cell allocating the resources.

In some examples, configuring the second cell as a cell allocating resources for the second scheduled transmission, where the configuration includes a control resource set, a search space, a scrambling sequence, a cell-specific configuration for the second cell, or a combination thereof, where the second priority is based on the cell allocating the resources.

The DCI transmission component 1215 may transmit, to a UE, a first downlink control information scheduling a first downlink transmission. In some examples, the DCI transmission component 1215 may transmit, to the UE, a second downlink control information scheduling a second downlink transmission. In some examples, the DCI transmission component 1215 may transmit a first downlink control information scheduling a first transmission associated with the first cell.

In some examples, the DCI transmission component 1215 may transmit the second downlink control information via a physical downlink control channel on the second cell, where the second cell has the second priority based on the physical downlink control channel being on the second cell. In some examples, the DCI transmission component 1215 may configure the second downlink control information using a format that excludes a carrier indicator.

In some examples, the DCI transmission component 1215 may transmit, as part of the second downlink control information, an indication that the second cell has the second priority based on the format. In some examples, the DCI transmission component 1215 may transmit the second downlink control information via a physical downlink control channel on the second cell. In some examples, the DCI transmission component 1215 may transmit the first downlink control information and the second downlink control information based on the UE capability.

In some examples, the DCI transmission component 1215 may transmit downlink control information indicating a switch of a bandwidth part, where the second priority is modified based on the switch of the bandwidth part. In some examples, the DCI transmission component 1215 may transmit the second downlink control information via a physical downlink control channel on the second cell, where the second cell has the second priority based on the physical downlink control channel being on the second cell.

In some examples, the DCI transmission component 1215 may configure the second downlink control information using a format that excludes a carrier indicator. In some examples, the DCI transmission component 1215 may transmit, as part of the second downlink control information, an indication that the second cell has the second priority based on the format. In some examples, the DCI transmission component 1215 may transmit the second downlink control information via a physical downlink control channel on the second cell. In some examples, the DCI transmission component 1215 may transmit the first downlink control information and the second downlink control information based on the UE capability.

The base station communications manager 1220 may transmit the first scheduled downlink transmission before the second scheduled downlink transmission. In some examples, the base station communications manager 1220 may receive a second feedback message associated with the second cell, the second feedback message being prioritized over a first feedback message based on the second priority, where the first feedback message is responsive to the first scheduled downlink transmission and the second feedback message is responsive to the second scheduled downlink transmission.

In some examples, the base station communications manager 1220 may transmit, after the first downlink control information, a second downlink control information scheduling a second transmission associated with the second cell. In some examples, the base station communications manager 1220 may communicate using the second scheduled transmission, where the second scheduled transmission is prioritized over the first scheduled transmission based on the second priority.

In some cases, the second feedback message is received before the first feedback message, the second feedback message interrupts the first feedback message, the second feedback message preempts the first feedback message, the second feedback message punctures the first feedback message, or a combination thereof In some cases, the first feedback message includes a first hybrid automatic repeat request feedback for the first downlink transmission. In some cases, the second feedback message includes a second hybrid automatic repeat request feedback for the second downlink transmission.

In some cases, the second scheduled transmission is received before the first scheduled transmission, the second scheduled transmission interrupts the first scheduled transmission, the second scheduled transmission preempts the first scheduled transmission, the second scheduled transmission punctures the first scheduled transmission, or a combination thereof In some cases, the first scheduled transmission includes a first physical downlink shared channel. In some cases, the second scheduled transmission includes a second physical downlink shared channel for a second downlink transmission. In some cases, the first scheduled transmission includes a first physical uplink shared channel. In some cases, the second scheduled transmission includes a second physical uplink shared channel.

The scheduling component 1225 may schedule the second scheduled downlink transmission on the second cell, where the second cell has the second priority based on the second downlink transmission being scheduled on the second cell.

In some examples, the scheduling component 1225 may schedule the second scheduled downlink transmission on the second cell, where the second cell has the second priority based on the second scheduled downlink transmission being on the second cell, or the physical downlink control channel being transmitted on the second cell, or a combination thereof In some examples, the scheduling component 1225 may schedule the second scheduled downlink transmission on a same cell that the second downlink control information is transmitted on, where the second feedback message is prioritized over the first feedback message based on the second downlink control information and the second scheduled downlink transmission being on the same cell.

In some examples, the scheduling component 1225 may schedule the second scheduled transmission on the second cell, where the second cell has the second priority based on the second scheduled transmission being scheduled on the second cell.

In some examples, the scheduling component 1225 may schedule the second scheduled transmission on the second cell, where the second cell has the second priority based on the second scheduled transmission being on the second cell, or the physical downlink control channel being transmitted on the second cell, or a combination thereof In some examples, the scheduling component 1225 may schedule the second scheduled transmission on a same cell as the second downlink control information, where the second scheduled transmission is prioritized over the first scheduled transmission based on the second downlink control information and the second scheduled transmission being on the same cell.

The indication manager 1230 may indicate, to the UE, that the second downlink control information is transmitted on the second cell, the indication including a cell identifier, a scrambling sequence, a control resource set, a search space, or a combination thereof, where at least one of the cell identifier, the control resource set, or the search space corresponds to the second cell.

In some examples, the indication manager 1230 may transmit, to the UE, an indication that the second cell has the second priority.

In some examples, the indication manager 1230 may indicate, to the UE, that the second downlink control information is transmitted on the second cell, the indication including a cell identifier, a scrambling sequence, a control resource set, a search space, or a combination thereof, where at least one of the cell identifier, the control resource set, or the search space corresponds to the second cell.

In some examples, the indication manager 1230 may transmit, to the UE, an indication that the second cell has the second priority. In some examples, the indication manager 1230 may transmit downlink control information indicating a switch of a bandwidth part, where the second priority is modified based on the switch of the bandwidth part.

Figure 13:
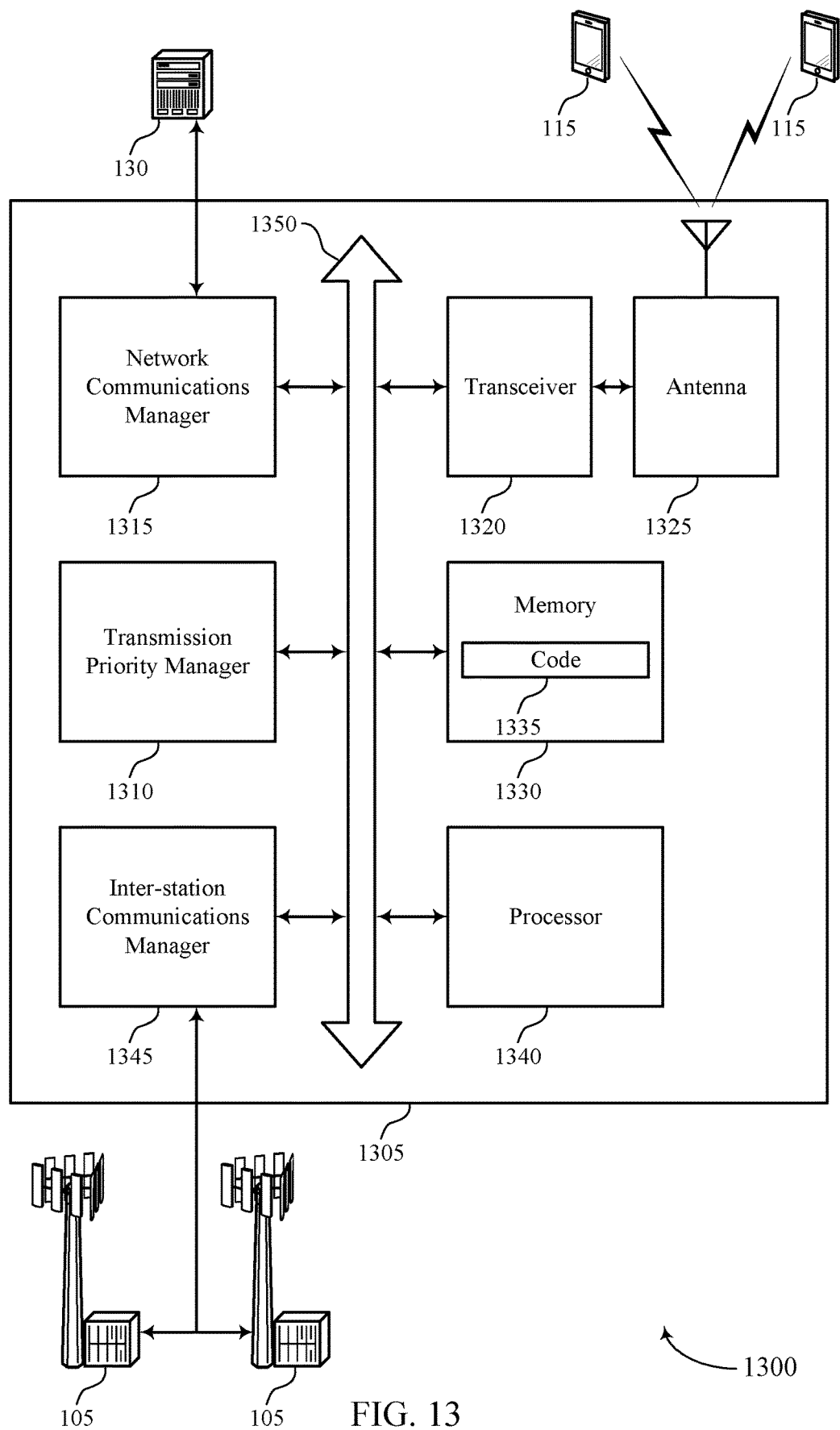
FIG. 13 shows a diagram of a system including a device that supports cell-based transmission priority in accordance with aspects of the present disclosure.

In some cases, the indication includes a cell-specific parameter that is modified via radio resource control signaling, a cell-specific parameter that is modified via medium access control (MAC) control element messaging, a bandwidth part-specific radio resource control parameter, or a combination thereof In some cases, the indication includes a cell-specific parameter that is modified via radio resource control signaling, a cell-specific parameter that is modified via medium access control (MAC) control element messaging, a bandwidth part-specific radio resource control parameter, or a combination thereof The capability manager 1235 may receive, from the UE, a report including a UE capability, the UE capability including an indication that the UE supports at least a subset of a first set of cells having the first priority, or at least subset of a second set of cells having the second priority, or a combination thereof In some examples, the capability manager 1235 may receive, from the UE, a report including a UE capability, the UE capability including an indication that the UE supports at least a subset of a first set of cells having the first priority, or at least subset of a second set of cells having the second priority, or a combination thereof FIG. 13 shows a diagram of a system 1300 including a device 1305 that supports cell-based transmission priority in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a transmission priority manager 1310, a network communications manager 1315, a transceiver 1320, an antenna 1325, memory 1330, a processor 1340, and an inter-station communications manager 1345. These components may be in electronic communication via one or more buses (e.g., bus 1350).

The transmission priority manager 1310 may identify a first priority for a first cell and a second priority for a second cell, where the second priority is greater than the first priority, transmit, to a UE, a first downlink control information scheduling a first downlink transmission, transmit, to the UE, a second downlink control information scheduling a second downlink transmission, transmit the first scheduled downlink transmission before the second scheduled downlink transmission, and receive a second feedback message associated with the second cell, the second feedback message being prioritized over a first feedback message based on the second priority, where the first feedback message is responsive to the first scheduled downlink transmission and the second feedback message is responsive to the second scheduled downlink transmission. The transmission priority manager 1310 may also identify a first priority for a first cell and a second priority for a second cell, where the second priority is greater than the first priority, transmit a first downlink control information scheduling a first transmission associated with the first cell, transmit, after the first downlink control information, a second downlink control information scheduling a second transmission associated with the second cell, and communicate using the second scheduled transmission, where the second scheduled transmission is prioritized over the first scheduled transmission based on the second priority.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cell-based transmission priority).

Based on enabling more efficient scheduling of transmissions with less buffer time based on their associated priorities, processor 1340 of a base station 105 may be ready to respond more efficiently through the reduction of a ramp up in processing power. As such, processor 1340 may conserve power of a base station 105.

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
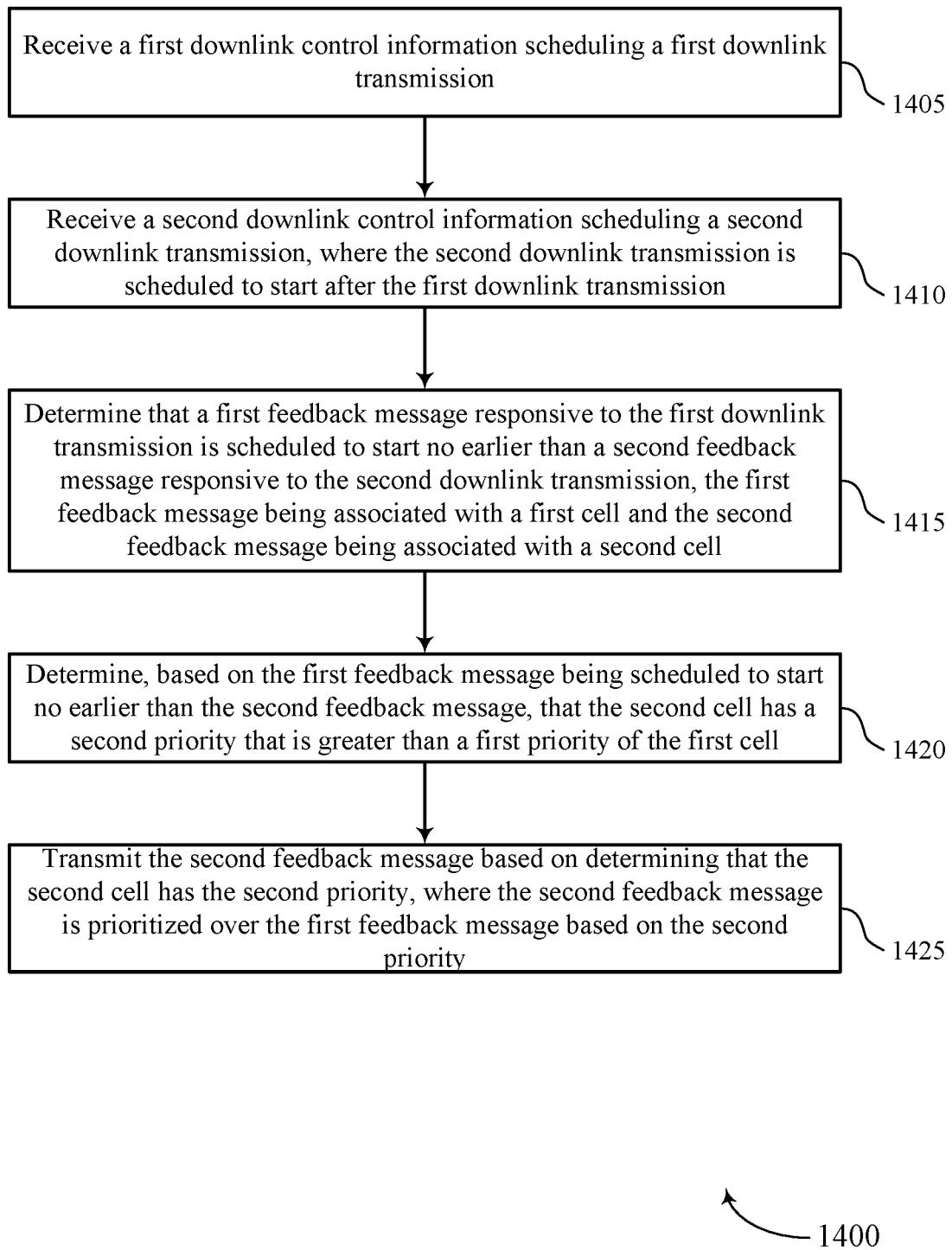
FIGS. 14 through 17 show flowcharts illustrating methods that support cell-based transmission priority in accordance with aspects of the present disclosure.

FIG. 14 shows a flowchart illustrating a method 1400 that supports cell-based transmission priority in accordance with aspects of the present disclosure. The operations of method 1400 may be implemented by a UE 115 or its components as described herein. For example, the operations of method 1400 may be performed by a transmission priority manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first downlink control information scheduling a first downlink transmission. The operations of 1405 may be performed according to the methods described herein. In some examples, aspects of the operations of 1405 may be performed by a DCI manager as described with reference to FIGS. 6 through 9.

At 1410, the UE may receive a second downlink control information scheduling a second downlink transmission, where the second downlink transmission is scheduled to start after the first downlink transmission. The operations of 1410 may be performed according to the methods described herein. In some examples, aspects of the operations of 1410 may be performed by a DCI manager as described with reference to FIGS. 6 through 9.

At 1415, the UE may determine that a first feedback message responsive to the first downlink transmission is scheduled to start no earlier than a second feedback message responsive to the second downlink transmission, the first feedback message being associated with a first cell and the second feedback message being associated with a second cell. The operations of 1415 may be performed according to the methods described herein. In some examples, aspects of the operations of 1415 may be performed by a feedback manager as described with reference to FIGS. 6 through 9.

At 1420, the UE may determine, based on the first feedback message being scheduled to start no earlier than the second feedback message, that the second cell has a second priority that is greater than a first priority of the first cell. The operations of 1420 may be performed according to the methods described herein. In some examples, aspects of the operations of 1420 may be performed by a cell priority component as described with reference to FIGS. 6 through 9.

At 1425, the UE may transmit the second feedback message based on determining that the second cell has the second priority, where the second feedback message is prioritized over the first feedback message based on the second priority. The operations of 1425 may be performed according to the methods described herein. In some examples, aspects of the operations of 1425 may be performed by a communications manager as described with reference to FIGS. 6 through 9.

Figure 15:
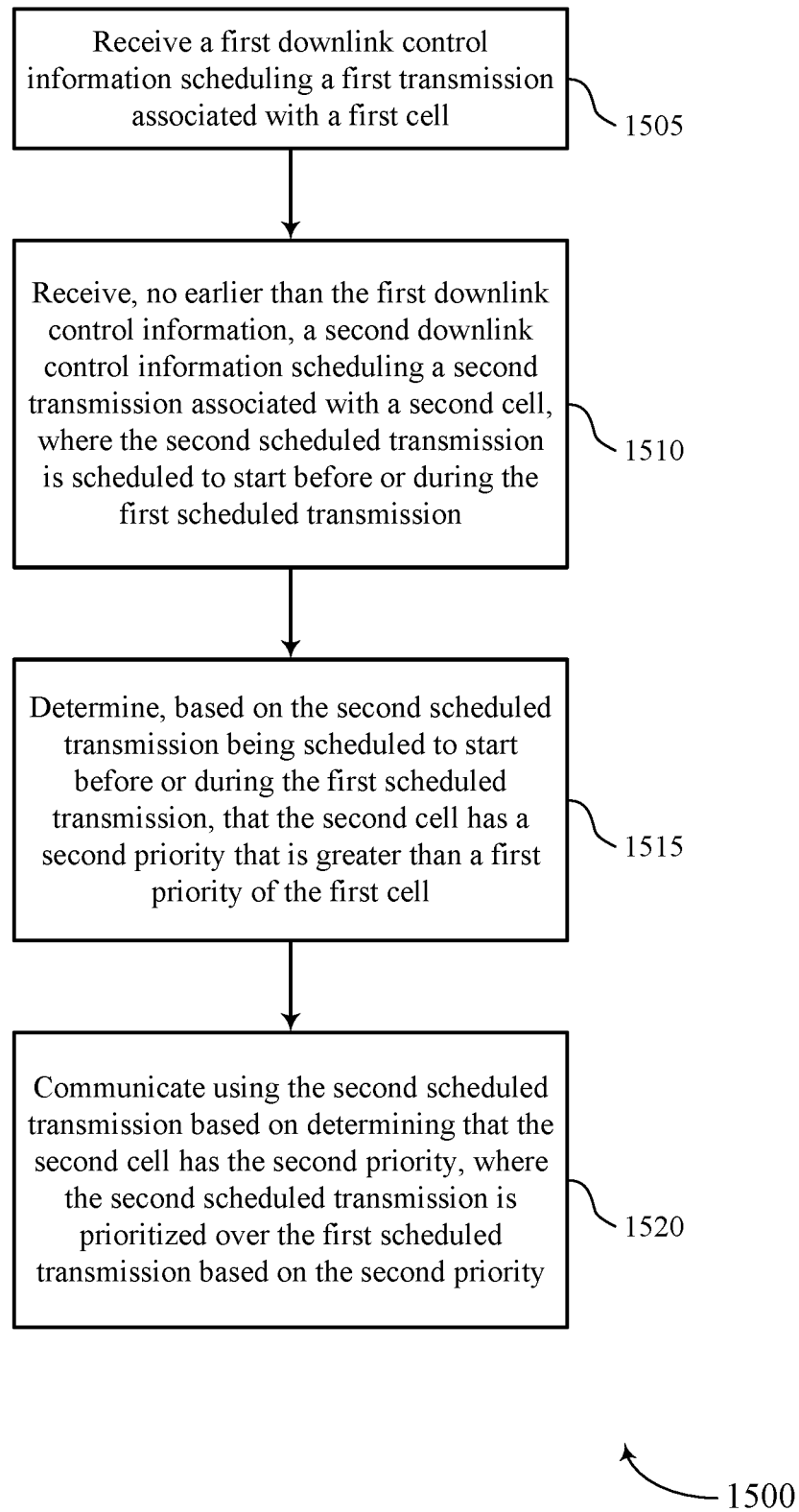

FIG. 15 shows a flowchart illustrating a method 1500 that supports cell-based transmission priority in accordance with aspects of the present disclosure. The operations of method 1500 may be implemented by a UE 115 or its components as described herein. For example, the operations of method 1500 may be performed by a transmission priority manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first downlink control information scheduling a first transmission associated with a first cell. The operations of 1505 may be performed according to the methods described herein. In some examples, aspects of the operations of 1505 may be performed by a DCI manager as described with reference to FIGS. 6 through 9.

At 1510, the UE may receive, no earlier than the first downlink control information, a second downlink control information scheduling a second transmission associated with a second cell, where the second scheduled transmission is scheduled to start before or during the first scheduled transmission. The operations of 1510 may be performed according to the methods described herein. In some examples, aspects of the operations of 1510 may be performed by a DCI manager as described with reference to FIGS. 6 through 9.

At 1515, the UE may determine, based on the second scheduled transmission being scheduled to start before or during the first scheduled transmission, that the second cell has a second priority that is greater than a first priority of the first cell. The operations of 1515 may be performed according to the methods described herein. In some examples, aspects of the operations of 1515 may be performed by a cell priority component as described with reference to FIGS. 6 through 9.

At 1520, the UE may communicate using the second scheduled transmission based on determining that the second cell has the second priority, where the second scheduled transmission is prioritized over the first scheduled transmission based on the second priority. The operations of 1520 may be performed according to the methods described herein. In some examples, aspects of the operations of 1520 may be performed by a communications manager as described with reference to FIGS. 6 through 9.

Figure 16:
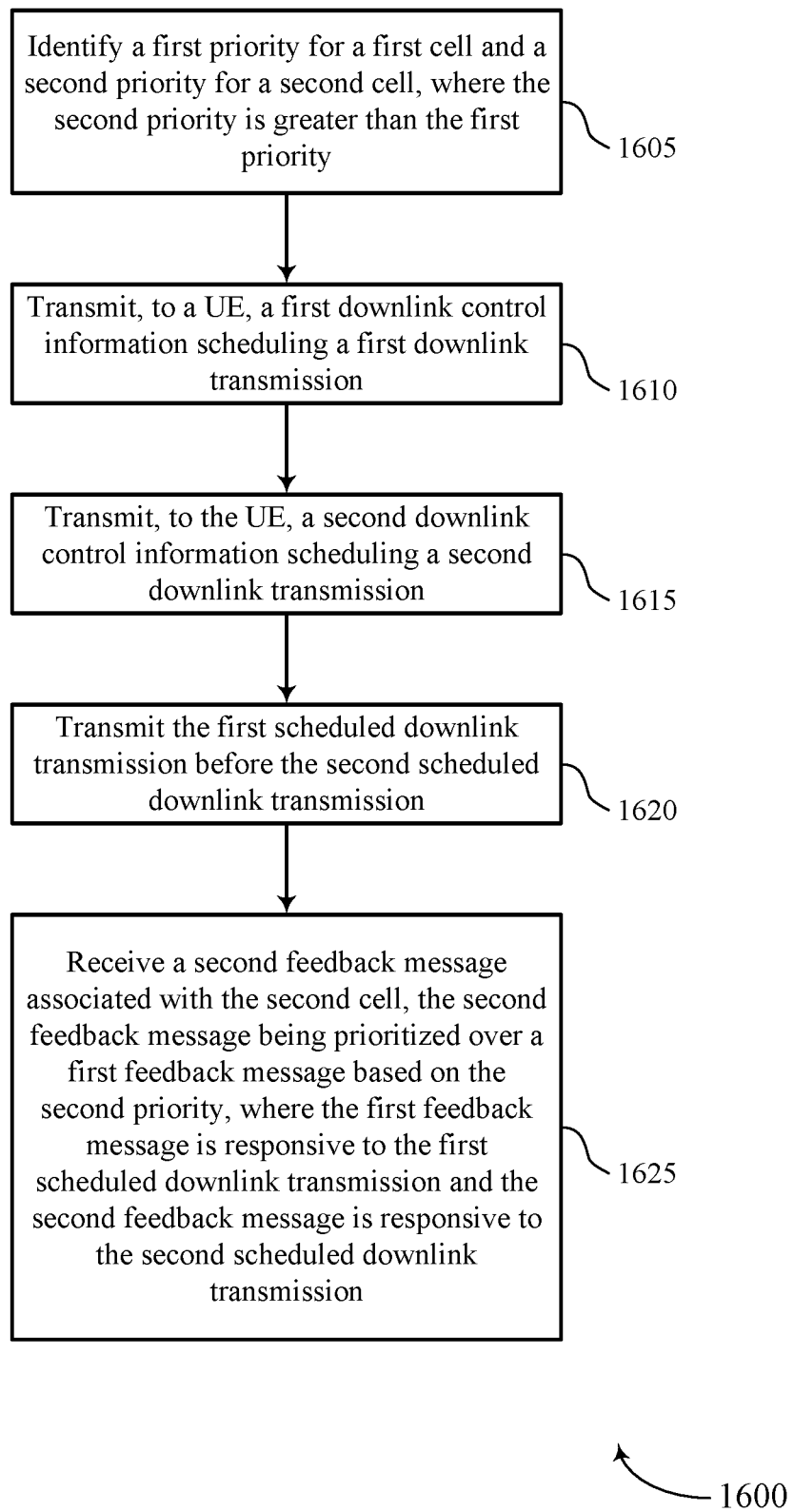

FIG. 16 shows a flowchart illustrating a method 1600 that supports cell-based transmission priority in accordance with aspects of the present disclosure. The operations of method 1600 may be implemented by a base station 105 or its components as described herein. For example, the operations of method 1600 may be performed by a transmission priority manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify a first priority for a first cell and a second priority for a second cell, where the second priority is greater than the first priority. The operations of 1605 may be performed according to the methods described herein. In some examples, aspects of the operations of 1605 may be performed by a cell manager as described with reference to FIGS. 10 through 13.

At 1610, the base station may transmit, to a UE, a first downlink control information scheduling a first downlink transmission. The operations of 1610 may be performed according to the methods described herein. In some examples, aspects of the operations of 1610 may be performed by a DCI transmission component as described with reference to FIGS. 10 through 13.

At 1615, the base station may transmit, to the UE, a second downlink control information scheduling a second downlink transmission. The operations of 1615 may be performed according to the methods described herein. In some examples, aspects of the operations of 1615 may be performed by a DCI transmission component as described with reference to FIGS. 10 through 13.

At 1620, the base station may transmit the first scheduled downlink transmission before the second scheduled downlink transmission. The operations of 1620 may be performed according to the methods described herein. In some examples, aspects of the operations of 1620 may be performed by a base station communications manager as described with reference to FIGS. 10 through 13.

At 1625, the base station may receive a second feedback message associated with the second cell, the second feedback message being prioritized over a first feedback message based on the second priority, where the first feedback message is responsive to the first scheduled downlink transmission and the second feedback message is responsive to the second scheduled downlink transmission. The operations of 1625 may be performed according to the methods described herein. In some examples, aspects of the operations of 1625 may be performed by a base station communications manager as described with reference to FIGS. 10 through 13.

Figure 17:
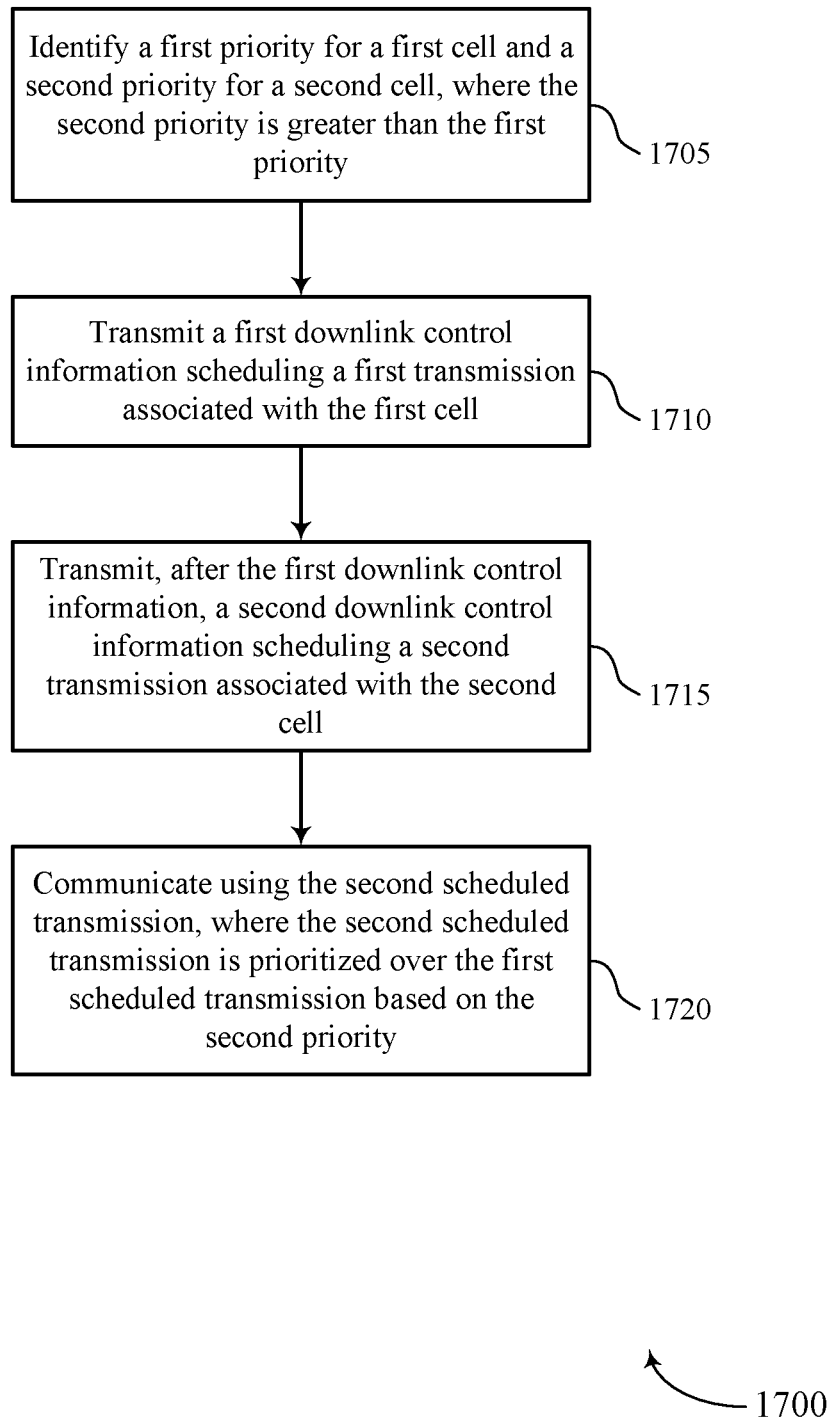

FIG. 17 shows a flowchart illustrating a method 1700 that supports cell-based transmission priority in accordance with aspects of the present disclosure. The operations of method 1700 may be implemented by a base station 105 or its components as described herein. For example, the operations of method 1700 may be performed by a transmission priority manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a first priority for a first cell and a second priority for a second cell, where the second priority is greater than the first priority. The operations of 1705 may be performed according to the methods described herein. In some examples, aspects of the operations of 1705 may be performed by a cell manager as described with reference to FIGS. 10 through 13.

At 1710, the base station may transmit a first downlink control information scheduling a first transmission associated with the first cell. The operations of 1710 may be performed according to the methods described herein. In some examples, aspects of the operations of 1710 may be performed by a DCI transmission component as described with reference to FIGS. 10 through 13.

At 1715, the base station may transmit, after the first downlink control information, a second downlink control information scheduling a second transmission associated with the second cell. The operations of 1715 may be performed according to the methods described herein. In some examples, aspects of the operations of 1715 may be performed by a base station communications manager as described with reference to FIGS. 10 through 13.

At 1720, the base station may communicate using the second scheduled transmission, where the second scheduled transmission is prioritized over the first scheduled transmission based on the second priority. The operations of 1720 may be performed according to the methods described herein. In some examples, aspects of the operations of 1720 may be performed by a base station communications manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving a first downlink control information scheduling a first downlink transmission;
   receiving a second downlink control information scheduling a second downlink transmission, wherein the second downlink transmission is scheduled to start after the first downlink transmission;
   determining that a first feedback message responsive to the first downlink transmission is scheduled to start no earlier than a second feedback message responsive to the second downlink transmission, the first feedback message being associated with a first cell and a first service type, and the second feedback message being associated with a second cell and a second service type, wherein the first service type and the second service type are different;
   determining, based at least in part on the first feedback message being scheduled to start no earlier than the second feedback message, that the second cell has a second priority that is greater than a first priority of the first cell; and
   transmitting the second feedback message based at least in part on determining that the second cell has the second priority, wherein the second feedback message is prioritized over the first feedback message based at least in part on the second priority.

2. The method of claim 1, wherein determining that the second cell has the second priority comprises:
   receiving the second downlink control information via a physical downlink control channel on the second cell; and
   determining that the second cell has the second priority based at least in part on the physical downlink control channel being on the second cell.

3. The method of claim 2, further comprising:
   identifying the second cell as a scheduling cell based at least in part on a control resource set, a search space, a scrambling sequence, a cell-specific configuration for the second cell, or a combination thereof, wherein the second priority is based at least in part on the scheduling cell.

4. The method of claim 1, wherein determining that the second cell has the second priority comprises:
   identifying that the second downlink transmission is scheduled to occur on the second cell based at least in part on the second downlink control information; and
   determining that the second cell has the second priority based at least in part on the second downlink transmission being scheduled on the second cell.

5. The method of claim 1, wherein determining that the second cell has the second priority comprises:
   receiving, from a base station, an indication that the second cell has the second priority, wherein the indication comprises a cell-specific parameter that is modified via radio resource control signaling.

6. The method of claim 1, wherein the second feedback message is transmitted before the first feedback message, the second feedback message interrupts the first feedback message, the second feedback message preempts the first feedback message, the second feedback message punctures the first feedback message, or a combination thereof.

7. The method of claim 1, wherein the first cell and the second cell comprise respective cells that are associated with a same physical cell.

8. The method of claim 1, wherein the first cell and the second cell comprise respective cells that are each associated with a different physical cell.

9. The method of claim 1, wherein:
   the first feedback message comprises a first hybrid automatic repeat request feedback for the first downlink transmission; and
   the second feedback message comprises a second hybrid automatic repeat request feedback for the second downlink transmission.

10. The method of claim 1, wherein:
    the first service type is enhanced mobile broadband (eMBB) and
    the second service type is ultra-reliable low-latency communication (URLLC).

11. The method of claim 1, further comprising:
    interrupting the first feedback message on the first cell with the second feedback message on the second cell based at least in part on determining that the second cell has the second priority that is greater than the first priority of the first cell, wherein a relative priority of the first cell and the second cell is a basis for whether interruption of the first feedback message is allowed by the second feedback message or whether interruption of the second feedback message is allowed by the first feedback message.

12. A method for wireless communications, comprising:
receiving a first downlink control information scheduling a first transmission associated with a first cell and a first service type;
receiving, no earlier than the first downlink control information, a second downlink control information scheduling a second transmission associated with a second cell and a second service type, wherein the first service type and the second service type are different, and wherein the second scheduled transmission is scheduled to start before or during the first scheduled transmission;
determining, based at least in part on the second scheduled transmission being scheduled to start before or during the first scheduled transmission, that the second cell has a second priority that is greater than a first priority of the first cell; and
communicating using the second scheduled transmission based at least in part on determining that the second cell has the second priority, wherein the second scheduled transmission is prioritized over the first scheduled transmission based at least in part on the second priority.

13. The method of claim 12, wherein determining that the second cell has the second priority comprises:
receiving the second downlink control information via a physical downlink control channel on the second cell; and
determining that the second cell has the second priority based at least in part on the physical downlink control channel being on the second cell.

14. The method of claim 13, further comprising:
identifying the second cell as a cell allocating resources for the second scheduled transmission based at least in part on a control resource set, a search space, a scrambling sequence, a cell-specific configuration for the second cell, or a combination thereof, wherein the second priority is based at least in part on the cell allocating the resources.

15. The method of claim 12, wherein determining that the second cell has the second priority comprises:
identifying that the second scheduled transmission is scheduled on the second cell based at least in part on the second downlink control information; and
determining that the second cell has the second priority based at least in part on the second scheduled transmission being scheduled on the second cell.

16. The method of claim 12, wherein determining that the second cell has the second priority comprises:
receiving, from a base station, an indication that the second cell has the second priority, wherein the indication comprises a cell-specific parameter that is modified via radio resource control signaling.

17. The method of claim 12, wherein the second scheduled transmission is communicated before the first scheduled transmission, the second scheduled transmission interrupts the first scheduled transmission, the second scheduled transmission preempts the first scheduled transmission, the second scheduled transmission punctures the first scheduled transmission, or a combination thereof.

18. The method of claim 12, wherein the first cell and the second cell comprise respective virtual cells that are associated with a same physical cell.

19. The method of claim 12, wherein the first cell and the second cell comprise respective virtual cells that are each associated with a different physical cell.

20. The method of claim 12, wherein:
the first scheduled transmission comprises a first physical downlink shared channel; and
the second scheduled transmission comprises a second physical downlink shared channel for a second downlink transmission.

21. The method of claim 12, wherein:
the first scheduled transmission comprises a first physical uplink shared channel; and
the second scheduled transmission comprises a second physical uplink shared channel.

22. The method of claim 12, wherein:
the first service type is enhanced mobile broadband (eMBB) and
the second service type is ultra-reliable low-latency communication (URLLC).

23. The method of claim 12, further comprising:
interrupting the first transmission on the first cell with the second transmission on the second cell based at least in part on determining that the second cell has the second priority that is greater than the first priority of the first cell, wherein a relative priority of the first cell and the second cell is a basis for whether interruption of the first feedback message is allowed by the second feedback message or whether interruption of the second feedback message is allowed by the first feedback message.

24. An apparatus for wireless communications, comprising:
a processor,
memory coupled with the processor; and
instructions stored in the memory and executable by the processor to cause the apparatus to:
receive a first downlink control information scheduling a first downlink transmission;
receive a second downlink control information scheduling a second downlink transmission, wherein the second downlink transmission is scheduled to start after the first downlink transmission;
determine that a first feedback message responsive to the first downlink transmission is scheduled to start after a second feedback message responsive to the second downlink transmission, the first feedback message being associated with a first cell and a first service type, and the second feedback message being associated with a second cell and a second service type, wherein the first service type and the second service type are different;
determine, based at least in part on the first feedback message being scheduled to start after the second feedback message, that the second cell has a second priority that is greater than a first priority of the first cell; and
transmit the second feedback message based at least in part on determining that the second cell has the second priority, wherein the second feedback message is prioritized over the first feedback message based at least in part on the second priority.

25. The apparatus of claim 24, wherein the instructions to determine that the second cell has the second priority are further executable by the processor to cause the apparatus to:

receive the second downlink control information via a physical downlink control channel on the second cell; and determine that the second cell has the second priority based at least in part on the physical downlink control channel being on the second cell.

26. The apparatus of claim 25, wherein the instructions are further executable by the processor to cause the apparatus to:

identify the second cell as a scheduling cell based at least in part on a control resource set, a search space, a scrambling sequence, a cell-specific configuration for the second cell, or a combination thereof, wherein the second priority is based at least in part on the scheduling cell.

27. The apparatus of claim 24, wherein the instructions to determine that the second cell has the second priority are further executable by the processor to cause the apparatus to:

identify that the second downlink transmission is scheduled to occur on the second cell based at least in part on the second downlink control information; and determine that the second cell has the second priority based at least in part on the second downlink transmission being scheduled on the second cell.

28. The apparatus of claim 24, wherein the instructions to determine that the second cell has the second priority are further executable by the processor to cause the apparatus to:

receive, from a base station, an indication that the second cell has the second priority, wherein the indication comprises a cell-specific parameter that is modified via radio resource control signaling.

29. An apparatus for wireless communications, comprising:

a processor, memory coupled with the processor; and instructions stored in the memory and executable by the processor to cause the apparatus to:

receive a first downlink control information scheduling a first transmission associated with a first cell and a first service type;

receive, after the first downlink control information, a second downlink control information scheduling a second transmission associated with a second cell and a second service type, wherein the first service type and the second service type are different, and wherein the second scheduled transmission is scheduled to start before or during the first scheduled transmission;

determine, based at least in part on the second scheduled transmission being scheduled to start before or during the first scheduled transmission, that the second cell has a second priority that is greater than a first priority of the first cell; and communicate using the second scheduled transmission based at least in part on determining that the second cell has the second priority, wherein the second scheduled transmission is prioritized over the first scheduled transmission based at least in part on the second priority.

30. The apparatus of claim 29, wherein the instructions to determine that the second cell has the second priority are further executable by the processor to cause the apparatus to:

receive the second downlink control information via a physical downlink control channel on the second cell; and determine that the second cell has the second priority based at least in part on the physical downlink control channel being on the second cell.

31. The apparatus of claim 30, wherein the instructions are further executable by the processor to cause the apparatus to:

identify the second cell as a cell allocating resources for the second scheduled transmission based at least in part on a control resource set, a search space, a scrambling sequence, a cell-specific configuration for the second cell, or a combination thereof, wherein the second priority is based at least in part on the cell allocating the resources.

32. The apparatus of claim 29, wherein the instructions to determine that the second cell has the second priority are further executable by the processor to cause the apparatus to:

identify that the second scheduled transmission is scheduled on the second cell based at least in part on the second downlink control information; and determine that the second cell has the second priority based at least in part on the second scheduled transmission being scheduled on the second cell.

* * * * *